(12) United States Patent
Bates et al.

(10) Patent No.: US 11,180,651 B2
(45) Date of Patent: Nov. 23, 2021

(54) SYNERGISTIC TOUGHENING OF EPOXY MODIFIED BY GRAPHENE AND BLOCK COPOLYMER

(71) Applicant: Regents of the University of Minnesota, Minneapolis, MN (US)

(72) Inventors: Frank S. Bates, St. Louis Park, MN (US); Lorraine Francis, Minnetonka, MN (US); Tuoqi Li, Freeport, TX (US)

(73) Assignee: Regents of the University of Minnesota, Minneapolis, MN (US)

( * ) Notice: Subject to any disclaimer, the term of this patent is extended or adjusted under 35 U.S.C. 154(b) by 175 days.

(21) Appl. No.: 16/331,025

(22) PCT Filed: Sep. 5, 2017

(86) PCT No.: PCT/US2017/050111
§ 371 (c)(1),
(2) Date: Mar. 6, 2019

(87) PCT Pub. No.: WO2018/048807
PCT Pub. Date: Mar. 15, 2018

(65) Prior Publication Data
US 2020/0190312 A1    Jun. 18, 2020

Related U.S. Application Data

(60) Provisional application No. 62/383,652, filed on Sep. 6, 2016.

(51) Int. Cl.
| | | |
|---|---|---|
| C08L 63/00 | (2006.01) | |
| C01B 32/194 | (2017.01) | |
| C01B 32/198 | (2017.01) | |
| C08J 3/21 | (2006.01) | |

(52) U.S. Cl.
CPC ............ *C08L 63/00* (2013.01); *C01B 32/194* (2017.08); *C01B 32/198* (2017.08); *C08J 3/212* (2013.01); *C08J 2363/00* (2013.01); *C08J 2471/02* (2013.01)

(58) Field of Classification Search
None
See application file for complete search history.

(56) References Cited

U.S. PATENT DOCUMENTS

| | | |
|---|---|---|
| 2008/0260955 A1 | 10/2008 | Hoyles et al. |
| 2016/0046771 A1 | 2/2016 | Thibodeau et al. |
| 2017/0253690 A1* | 9/2017 | Feng .................. C08G 59/1466 |

FOREIGN PATENT DOCUMENTS

| | | |
|---|---|---|
| CN | 109983077 A | 7/2019 |
| DE | 112017004473 T5 | 6/2019 |
| WO | WO-2015184233 A1 | 12/2015 |
| WO | WO-2018048807 A1 | 3/2018 |

OTHER PUBLICATIONS

"International Application Serial No. PCT/US2017/050111, International Search Report dated Dec. 20, 2017", 4 pgs.

"International Application Serial No. PCT/US2017/050111, Written Opinion dated Dec. 20, 2017", 6 pgs.

Kausar, A, et al., "Perspectives of epoxy/graphene oxide composite", Polymer-Plastics Technology and Engineering vol. 55, No. 7, (Nov. 5, 2015), 704-722.

Li, et al., "Synergistic toughening of epoxy modified by graphene and block copolymer micelles", Macromolecules vol. 49,, (Dec. 9, 2016), 9507-9520.

"Chinese Application Serial No. 201780054096.1, Notification on Correction of Deficiencies dated Mar. 28, 2019", w/o English Translation, 1 pg.

"International Application Serial No. PCT/US2017/050111, International Preliminary Report on Patentability dated Mar. 21, 2019", 8 pgs.

* cited by examiner

*Primary Examiner* — Robert T Butcher
(74) *Attorney, Agent, or Firm* — Schwegman Lundberg & Woessner, P.A.

(57) ABSTRACT

Embodiments are directed to compositions comprising (i) amphiphilic block copolymer, (ii) resin material; and amine modified graphene oxide; where the composition shows a synergic effect in critical strain energy release rate (Glc) value versus predicted value calculated by adding (i) the Glc value for neat resin material, plus (ii) the difference in Glc found when adding the amphiphilic block copolymer to the resin material versus the neat resin material, plus (iii) the difference in Glc found when adding the amine modified graphene oxide to the resin material versus the neat resin material.

20 Claims, 9 Drawing Sheets

SYNERGISTIC TOUGHENING OF EPOXY MODIFIED BY GRAPHENE AND BLOCK COPOLYMER

CLAIM OF PRIORITY

This patent application is a U.S. National Stage Application under 35 U.S.C. 371 from International Application Serial No. PCT/US2017/050111, filed on Sep. 5, 2017, and published as WO2018/048807 on Mar. 15, 2018, which claims the benefit of priority of U.S. Provisional Patent Application Ser. No. 62/383,652, filed on Sep. 6, 2017, and which applications are incorporated herein by reference in their entirety.

GOVERNMENT RIGHTS

The subject matter disclosed herein was made with government support under Award Number 1420013 awarded by the National Science Foundation. The Government has certain rights in the herein disclosed subject matter.

TECHNICAL FIELD

The disclosure concerns epoxy resins with improved toughness.

BACKGROUND

Glassy thermosets, such as epoxy, are brittle and lack the mechanical toughness needed for many applications. Traditional toughening strategies for epoxy thermosets can be roughly classified into two categories: modification with soft additives, including liquid rubbers and amphiphilic block copolymers; modification with rigid fillers, like silica particles, carbon nanotubes, clays, and graphenes. Both categories have their limitations.

In soft additive toughened epoxies, modifiers like liquid rubbers have to be added at high loadings (ca. 20 wt. %) to achieve a satisfactory toughness improvement. However, the resultant epoxy products possess dramatically reduced elastic modulus, hardness and glass transition temperature, and they are likely to lose optical transparency. Block copolymers can overcome those side-effects due to their exceptional toughening efficacy (improve Glc by an order of magnitude) at low loadings (ca. 5 wt. %), while a modest drop in the elastic modulus (~10%) is still inevitable.

In rigid filler toughened epoxies, the preferred loading is usually 1-5 wt. % for desirable toughness enhancement, which, however, severely limits the processability of formulations.

SUMMARY

Embodiments are directed compositions comprising (i) amphiphilic block copolymer comprising at least one epoxy miscible block and at least one epoxy immiscible block; (ii) resin material; and (iii) amine modified graphene oxide; wherein the composition shows a synergic effect in critical strain energy release rate ($GI_c$) value versus predicted value calculated by adding (i) the $GI_c$ value for neat resin material, plus (ii) the difference in $GI_c$ found when adding the amphiphilic block copolymer to the resin material versus the neat resin material, plus (iii) the difference in $GI_c$ found when adding the amine modified graphene oxide to the resin material versus the neat resin material.

In some embodiments, at least one epoxy miscible block comprises poly(alkylene oxide). In certain embodiments, the poly(alkylene oxide) block comprises poly(ethylene oxide). Some epoxy immiscible blocks comprise one or more alkylene oxide monomer units having at least four carbon atoms. Some preferred epoxy immiscible blocks comprise poly(butylene oxide).

Some amphiphilic block copolymers have a molecular weight ($M_n$) of from about 1000 to about 30,000. Certain compositions have a weight ratio of epoxy miscible block to epoxy immiscible block ranges from 9:1 to 1:9. In some compositions, the amount of amine modified graphene oxide is about 0.04 wt % to about 5 wt % based on the total weight of the composition. In certain compositions, the amount of modified graphene oxide is about 0.1 wt % to about 2 wt % based on the total weight of the composition. Some amine modified graphene oxide comprises surface modification with amine-terminated poly(butadiene-acrylonitrile). Certain amine modified graphene oxide comprises amine-functionalized exfoliated graphene oxide.

Any suitable block copolymer may be used. Some block copolymers comprise at least one of poly(ethylene oxide)-b-poly(butylene oxide)(PEO-b-PBO) and poly(ethylene oxide)-b-poly(butylene oxide)-b-poly(ethylene oxide) (PEO-b-PBO-b-PEO). Certain compositions additionally comprising a second amphiphilic block copolymer comprising poly(ethylene oxide)-b-poly(ethylene-alt-propylene) (PEO-b-PEP), poly(isoprene-b-ethylene oxide) (PI-b-PEO), poly(ethylene propylene-b-ethylene oxide) (PEP-b-PEO), poly(butadiene-b-ethylene oxide) (PB-b-PEO), poly(isoprene-b-ethylene oxide-b-isoprene) (PI-b-PEO-PI), poly(ethylene oxide-b-isoprene-b-ethylene oxide) (PEO-b-PI-b-PEO), poly(isoprene-b-ethylene oxide-b-methylmethacrylate) (PI-b-PEO-b-PMMA); or mixtures thereof.

Any suitable resin may be utilized. In some preferred embodiments, the resin material comprises one or both of epoxy or polyurethane. Certain resins comprise an epoxy vinyl ester resin comprising the reaction product of (a) a polyepoxide resin; and (b) an unsaturated carboxylic acid, or a mixture of an unsaturated carboxylic acid and maleic anhydride.

The composition mixtures of the various embodiments described herein show synergy in certain properties versus the individual components. Some compositions have at least a 10 fold increase in the critical strain energy release rate ($GI_c$) over the neat resin material. In other compositions, the synergistic effect is at least 25%.

Some amine modified graphene oxide are produced by a process comprising (i) reacting graphene oxide with a diisocyanate compound to produce an isocyanate-modified graphene oxide and (ii) reacting the isocyanate-modified graphene oxide with diamine compound to produce the amine modified graphene oxide.

Some compositions comprise (i) about 75 wt % to about 98 wt % resin material; (ii) about 2 to about 20 wt % amphiphilic block copolymer; and (iii) about 0.04 wt % to about 5 wt % of amine modified graphene oxide; the weight percentages based on the total weight of the composition and the total weight percentage not exceeding 100 wt %. Certain compositions comprise (i) about 83 wt % to about 96 wt % resin material; (ii) about 4 to about 15 wt % amphiphilic block copolymer; and (iii) about 0.1 wt % to about 2 wt % of amine modified graphene oxide; the weight percentages based on the total weight of the composition and the total weight percentage not exceeding 100 wt %. Yet other compositions comprise (i) about 83 wt % to about 96 wt % epoxy resin; (ii) about 4 to about 15 wt % poly(ethylene oxide)-b-poly(butylene oxide)(PEO-b-PBO); and (iii) about 0.1 wt % to about 2 wt % of amine modified graphene oxide; the weight percentages based on the total weight of the composition and the total weight percentage not exceeding 100 wt %.

Embodiments also concern processes for producing the compositions discussed herein. Some processes comprise:

(a) dissolving an amphiphilic block copolymer in a solvent to produce an amphiphilic block copolymer solution; said amphiphilic block copolymer comprising at least one epoxy miscible block and at least one epoxy immiscible block;

(b) adding amine-modified graphene oxide to the amphiphilic block copolymer solution to produce a graphene oxide containing mixture;

(c) mixing a resin component into graphene oxide containing mixture to produce a resin containing mixture; and (d) removing the solvent from the resin containing mixture to produce a solvent-free mixture.

Certain processes further comprise:

(e) adding a catalyst to the solvent-free mixture to produce a catalyst-containing mixture;

(f) adding the catalyst-containing mixture to a mold and heating the catalyst-containing mixture to produce a molded article; and (g) removing the molded article from the mold.

Some articles have at least a 10 fold increase in the critical strain energy release rate ($GI_c$) over the neat resin material. Certain molded articles show a synergic effect in critical strain energy release rate ($GI_c$) value versus predicted value calculated by adding (i) the $GI_c$ value for neat resin material, plus (ii) the difference in $GI_c$ found when adding the amphiphilic block copolymer to the resin material versus the neat resin material, plus (iii) the difference in GI found when adding the amine modified graphene oxide to the resin material versus the neat resin material. In some embodiments, the synergistic effect is at least 25%.

DETAILED DESCRIPTION OF ILLUSTRATIVE EMBODIMENTS

Figure 1:
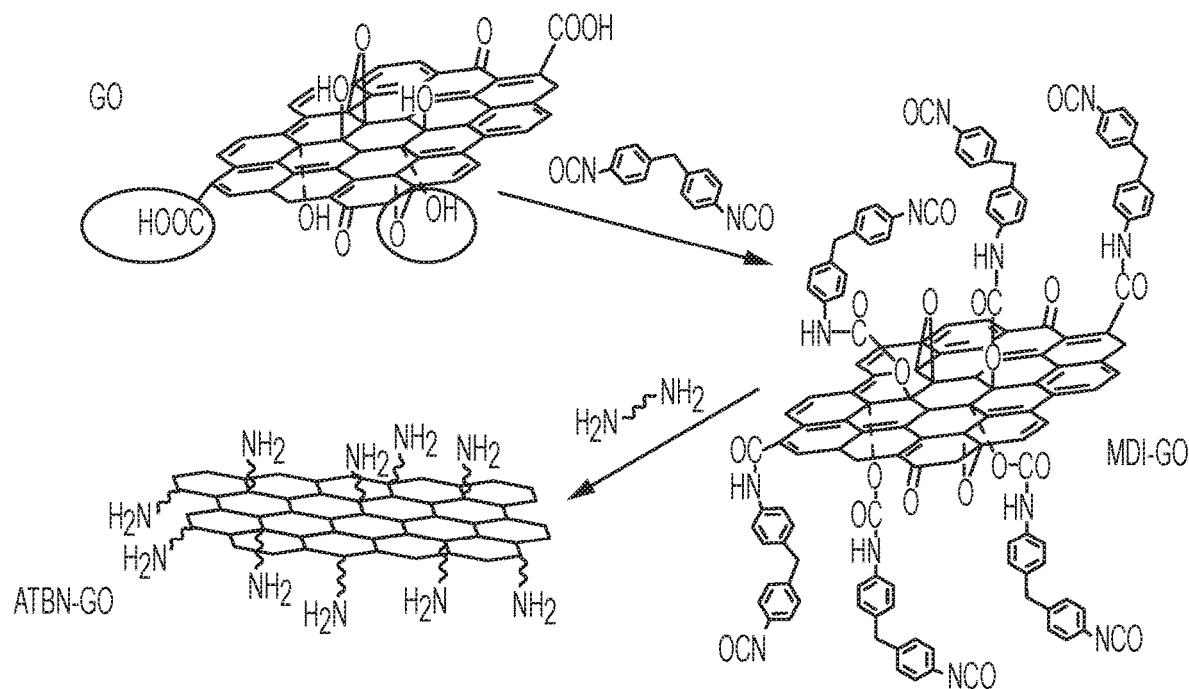
FIG. 1 is a schematic of the functionalization of graphene oxide (GO).

Detailed embodiments are disclosed herein. It is to be understood that the disclosed embodiments are merely examples that may be embodied in various forms. Therefore, specific structural and functional details disclosed herein are not to be interpreted as limits, but merely as a basis for teaching one skilled in the art to employ the various embodiments described herein. The specific examples below will enable the embodiments described herein to be better understood. However, they are given merely by way of guidance and do not imply any limitation.

The various embodiments may be understood more readily by reference to the following detailed description taken in connection with the accompanying figures and examples, which form a part of this disclosure. It is to be understood that the claim scope is not limited to the specific materials, devices, methods, applications, conditions or parameters described and/or shown herein, and that the terminology used herein is for the purpose of describing particular embodiments by way of example only and is not intended to be limiting. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the embodiments described herein which are, for clarity, described herein in the context of separate embodiments, may also be provided in combination in a single embodiment. Conversely, various features of the embodiments described herein that are, for brevity, described in the context of a single embodiment, may also be provided separately or in any subcombination. Further reference to values stated in ranges includes each and every value within that range.

The following definitions are intended to assist in understanding the disclosure:

The use of "a" or "an" are employed to describe elements and components of the embodiments described herein. This is done merely for convenience and to give a general sense of the embodiments described herein. This description should be read to include one or at least one and the singular also includes the plural unless it is obvious that it is meant otherwise.

As used herein, the terms "about" and "at or about" mean that the amount or value in question can be the value designated some other value approximately or about the same. It is generally understood, as used herein, that it is the nominal value indicated ±5% variation unless otherwise indicated or inferred. It is understood that where "about" is used before a quantitative value, the parameter also includes the specific quantitative value itself, unless specifically stated otherwise.

Ranges can be expressed herein as from one particular value to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein.

Unless defined otherwise, all technical and scientific terms used herein have the same meaning as commonly understood by one of ordinary skill in the art to which this disclosure belongs.

Unless specified to the contrary herein, all test standards are the most recent standard in effect at the time of filing this application Resin Any suitable resin may be utilized in the various embodiments described herein. In some embodiments, the resin if epoxy or polyurethane. In some preferred embodiments, epoxy materials are used as the resin.

In some embodiments, the epoxy materials may contain the components shown below. Diglycidyl ether of bisphenol A can be used as the epoxy-containing material. Bisphenol A can be used as the chain extender. 1,1,1-Tris(4-hydroxyphenol)ethane may be used as the cross-liker. Variations in molecular weight between cross-links ($M_c$) can be achieved by variation of the ratio of the cross-linker to chain extender in the formulation.

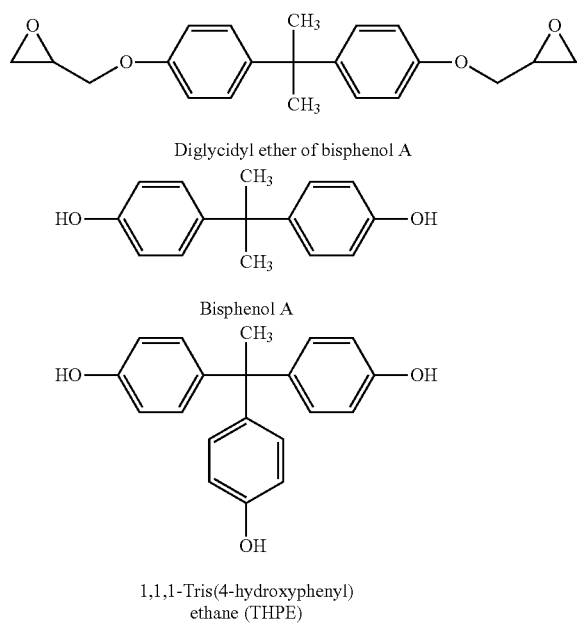

Diglycidyl ether of bisphenol A

Bisphenol A 1,1,1-Tris(4-hydroxyphenyl)
ethane (THPE)

Amphiphilic Block Copolymer

Any suitable amphiphilic block copolymer may be utilized in the various embodiments described herein. Preferably, the amphiphilic polyether block copolymer comprises at least one ester resin material miscible polyether block segment derived from an alkylene oxide such as ethylene oxide (EO) and at least one ester resin material immiscible polyether block segment derived from an alkylene oxide having at least more than 3 carbon atoms, for example 1,2-epoxy butane (also known as butylene oxide (BO)). The immiscible block segment may also be comprised of mixtures of C4 or higher carbon analogue monomers that are copolymerized together to provide the immiscible block segment. The immiscible block may also contain lower molecular weight co-monomers such as ethylene oxide (EO). The polyether block copolymer typically contains at least one ester resin miscible polyether block segment, E, and at least one ester resin immiscible polyether block segment, M. For additional details on suitable amphiphilic block copolymers and their synthesis, see, published U.S. Patent Application No. 2007-0265373, the disclosure of which is incorporated herein.

Amphiphilic polystyrene-b-poly-(ethylene oxide) (PS-PEO) and poly(ethylene-alt-propylene)-b-poly(ethylene oxide) (PEP-PEO) block copolymers can be synthesized according to previously reported procedures. See, Hillmyer, M. A.; Bates, F. S. Macromolecules 1996, 29 (22), 6994-7002 and Bailey, T. S.; Pham, H. D.; Bates, F. S. Macromolecules 2001, 34 (20), 6994-7008.

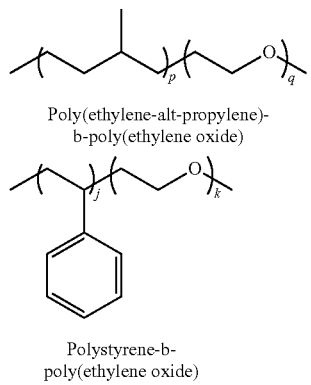

Poly(ethylene-alt-propylene)-
b-poly(ethylene oxide)

Polystyrene-b-
poly(ethylene oxide)

Amine Modified Graphene

Graphene utilized in the instant disclosure includes graphene with amine functionality. Such functionality may be added by any known means. In some embodiments, isocyanate functionality is added to graphene oxide to produce isocyanate functionalized graphene. Polyisocyanates, including diisocyanates, may be utilized. Examples of suitable isocyanates include 3-isopropenyl-α,α-dimethylbenzyl isocyanate (TMI) and methylene diphenyl diisocyanate (MDI). The isocyanate functionalized graphene oxide may be reacted with a compound to produce an amine-functionalized graphene. For example, alkyl diamines, aryl diamines, alkyl or aryl groups functionalized with at least one amine and at least one hydroxyl functionality.

Figure 2:
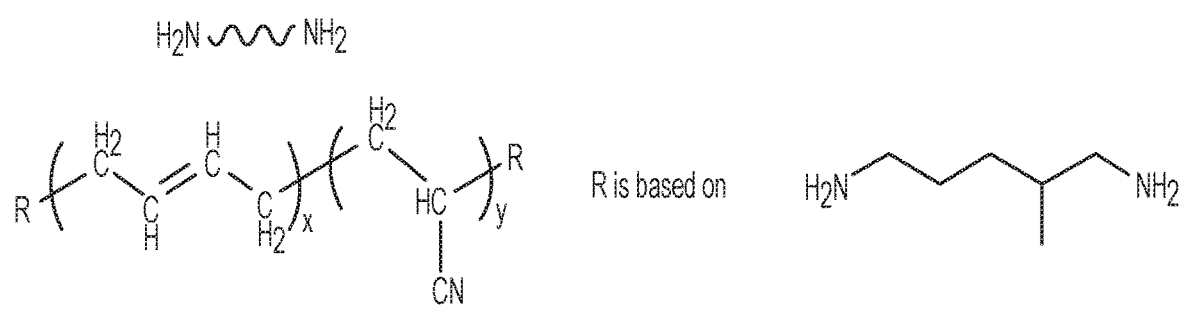
FIG. 2 is the structure of amine-terminated polybutadiene-polyacrylonitrile (ATBN).

FIG. 1 shows a schematic of the functionalization of graphene oxide (GO). At the top left, graphene oxide is provided with hydroxyl and carboxyl functionalities circled. Methylene diphenyl diisocyanate (MDI) is added to the GO to produce isocyanate-functionalized GO (MDI-GO). Amine-terminated polybutadiene-polyacrylonitrile (ATBN) is added to the MDI-GO to form ATBN-GO. FIG. 2 shows the structure of ATBN.

Methods for production of amine functionalized graphenes may be found in published U.S. Patent Application No. 2015-0344666, the disclosure of which is incorporated herein by reference.

Compositions

Composition of the various embodiments described herein comprise (a) amphiphilic block copolymer, (b) resin material; and (c) amine modified graphene oxide. Importantly, the compositions show a synergic effect in critical strain energy release rate (Gig) value versus predicted value calculated by adding (i) the $G_{I_c}$ value for neat resin material, plus (ii) the difference in $G_{I_c}$ found when adding the amphiphilic block copolymer to the resin material versus the neat resin material, plus (iii) the difference in $G_{I_c}$ found when adding the amine modified graphene oxide to the resin material versus the neat resin material.

Some compositions comprise about 75 wt % to about 98 wt % resin material; about 2 to about 20 wt % amphiphilic block copolymer; and about 0.04 wt % to about 5 wt % of amine modified graphene oxide; wherein the weight percentages based on the total weight of the composition and the total weight percentage not exceeding 100 wt %.

Certain compositions comprise about 83 wt % to about 96 wt % resin material; about 4 to about 15 wt % amphiphilic block copolymer; and about 0.1 wt % to about 2 wt % of amine modified graphene oxide, wherein the weight percentages based on the total weight of the composition and the total weight percentage not exceeding 100 wt %.

Other compositions comprise about 83 wt % to about 96 wt % epoxy resin; about 4 to about 15 wt % poly(ethylene oxide)-b-poly(ethylene-alt-propylene); and about 0.1 wt % to about 2 wt % of amine modified graphene oxide; wherein the weight percentages based on the total weight of the composition and the total weight percentage not exceeding 100 wt %.

EXAMPLES

Materials. The chemical structures of the epoxy resin ingredients and the block copolymer modifier used in this study are presented in Scheme 1. The epoxy monomer is diglycidyl ether of bisphenol A (D.E.R. 332) provided by the Dow Chemical Company. The hardener is a mixture of two components: the trifunctional crosslinker 1,1,1-tris(4-hydroxyphenyl)ethane (THPE, Aldrich) and difunctional chain extender bisphenol A (Parabis, Dow Chemical). Both of these components react with the epoxy monomer; the ratio of the crosslinker to chain extender in the formulation was varied to systematically alter the crosslink density of the resulting network. Ethyltriphenylphosphonium acetate (70% in methanol, Alfa Aesar) was used as a catalyst to decrease curing time and to afford greater control of network branching, leading to a more uniform epoxy network.

Two additives were used to modify the epoxy. The first is a model poly(ethylene oxide)-b-poly(ethylene-alt-propylene) (PEO-b-PEP) diblock copolymer, also referred to as OP. A full description of the synthesis of PEO-b-PEP diblock copolymers can be found elsewhere.66 The number-average molecular weight ($M_n$) of the OP diblock is 29 kg/mol, the weight fraction of PEO is 43% and the molecular weight dispersity (Mw/Mn) is 1.14. In cured epoxies, this OP diblock forms spherical micelles with the epoxy-philic PEO as the corona and the epoxy-phobic PEP as the rubbery core. The second modifier is a graphene oxide (GO) surface-modified with amine-terminated poly(butadiene-acrylonitrile) (ATBN), also identified as GA.

Preparation of GA.

GO was prepared from natural graphite and then grafted with ATBN following a similar protocol as reported elsewhere.43 ATBN chains (Hypro™ 1300×42 ATBN, with molecular weight 3.8 kg/mol, Emerald Performance Materials) were grafted onto GO using 4,4'-methylene diphenyl diisocynate (MDI, Sigma-Aldrich) as the coupling agent. GO (200 mg) and MDI (4 g) were placed in a 250 mL round-bottom flask, which was then purged with nitrogen for 30 min. Anhydrous dimethytformamide (DMF) was injected into the flask, and the mixture was magnetically stirred for 15 min followed by bath sonication to disperse the GO. The reaction was carried out in an oil bath at 60° C. and completed after 24 h, and then the mixture was flocculated by adding anhydrous toluene. The solid product was washed with anhydrous toluene at least five times to remove any excess MDI, and then was redispersed in DMF (100 mL) without drying, and a solution of 10 wt. % ATBN in DMF (20 g) was added into the dispersion while stirring. The reaction was carried out at 60° C. for 24 h with nitrogen purging. Acetone was used to flocculate the mixture, and then the solid product was collected by centrifugation. After washing with acetone at least five times, GA was washed twice with tert-butanol, redispersed in this solvent, then freeze-dried resulting in a dry powder.

Preparation of Epoxy Composites. In this work, the consequences on composite microstructure and toughness of four formulation variables were explored: cured epoxy modified with (i) GA, (ii) OP, (iii) GA and OP, and (iv) the crosslink density of the epoxy network. Neat epoxy thermosets, binary composites (GA/epoxy and OP/epoxy) and GA/OP/epoxy ternary composites were prepared using similar procedures. For the ternary blend the OP block copolymer was first dissolved in approximately 40 mL of acetone at room temperature, then GA was added into the same round-bottom flask. To help disperse the GA, the mixture was bath sonicated for 30 minutes; control experiments without GA showed no impact of this step on the properties of the cured resins. Resin components were then added and homogeneously mixed in the sequence D.E.R. 332, Parabis and THPE. Acetone was completely removed by maintaining the formulation under dynamic vacuum at 90° C. for 1 h, then at 110° C. for 1 h, and finally at 130° C. for another hour. The catalyst (ethyltriphenylphosphonium acetate) was then added and mixed for 1-2 min prior to transferring the full formulated resin into a preheated mold maintained at 130° C. The resulting plaque was cured at 200° C. for 2 h, and allowed to slowly cool down to room temperature inside the oven.

The crosslink density of the epoxy network is described in terms of the average molecular weight between crosslinks (Mc), which is inversely proportional to crosslink density. The theoretical value of Mc was estimated based on the following relationship.

$$M_c = \frac{2\left(M_e + \sum_{f=2}^{\infty} \frac{M_f \Phi_f}{f}\right)}{\sum_{f=3}^{\infty} \Phi_f} \quad (1)$$

where $M_e$ is the epoxide equivalent weight (EEW) of the epoxy monomer (i.e., the ratio of the epoxy monomer molecular weight and the number of epoxide groups in the molecule), $M_f$ is the molecular weight of a molecule with functionality f in the hardener mixture, and $\Phi_f$ is the mole fraction of hydrogens provided by the f-functional molecule in the hardener mixture. Equation (1) assumes complete conversion of all functional groups and an exact stoichiometry between the reactive hydrogens from the hardener mixture and the epoxide group from the epoxy monomers. Given that all epoxy networks are composed of the same three basic ingredients as shown in Scheme 1, variations in Mc are solely determined by the ratio of the crosslinker to the chain-extender in the hardener mixture, which is captured by the parameter r in Equation (1). For the experiments described herein four different $\Phi f$ values were selected, resulting in the following theoretical Mc values: 700, 1550, 3050 and 6100 g/mol. Following previously established nomenclature, the four epoxy materials are referred to as CET-700, CET-1550, CET-3050 and CET-6100, respectively, where CET stands for chain extended thermoset.

Microstructure Characterization.

Transmission electron microscopy (TEM) was used to characterize the block copolymer morphology and the dispersion of the GA filler in cured epoxy thermosets. At room temperature, epoxy specimens were sectioned with a Reichert Ultramicrotome S fitted with a Micro Star diamond knife. Ultrathin sections (ca. 70-90 nm) were floated on distilled water and then collected onto copper grids. TEM specimens containing block copolymer OP were vapor stained for 15 min with 0.5 wt. % $RuO_4$ aqueous solution before imaging using an FEI Tecnai T12 TEM at 120 kV accelerating voltage.

Mechanical Properties.

The fracture toughness of neat and modified epoxy samples was quantified using a linear elastic fracture mechanics approach. Measurements were conducted following the compact tension ASTM standard D 5045 protocol. Fully cured epoxy plaques were used to prepare compact tension specimens. Prior to the test, a sharp pre-crack was initiated ahead of the machined notch in each specimen by tapping with a fresh razor blade that was previously immersed into liquid nitrogen. The critical stress intensity factor ($K_{Ic}$) of the material was calculated from the peak force ($P_{max}$) required to propagate the crack and the specimen geometry, $$K_{Ic} = \frac{P_{max}}{BW^{1/2}} f\left(\frac{a}{W}\right) \quad (2)$$

where the subscript I indicates that the crack opening is mode I, B is the specimen thickness, W is the specimen width, a is the initial crack length, and f(a/W) is a geometric factor listed in the ASTM standard. In this work, the critical strain energy release rate ($G_{Ic}$) is also reported, which can be determined by the following relationship:

$$G_{Ic} = \frac{K_{Ic}^2}{E}(1 - v^2) \quad (3)$$

where E is the modulus of the material and ∪ is the Poisson's ratio taken as 0.34. Specimens were tested at room temperature at a cross-head speed rate of 10 mm/min.

Room temperature moduli of cured epoxies were determined using dynamic mechanical spectroscopy measurements obtained with a DMA-8000 (PerkinElmer) instrument using a three-point bending configuration, and operated under a frequency of 10 rad/s and variable strain between 0.01 and 0.1%. The reported values of fracture toughness and elastic modulus were averaged over at least ten specimens from two independently prepared plaques made for each of the composite formulations. The reproducibility of the data was verified by comparing the two sets of results obtained with specimens from the two different plaques for each formulation. To compare the value difference, a t-test with a threshold for statistical significance set to 0.05 was used.

Topography of Fracture Surfaces.

To explore the toughening mechanisms, fracture surfaces of failed compact tension specimens were imaged using a JEOL 6500F field emission scanning electron microscope (FESEM). The fracture surfaces were first coated with a thin platinum layer (ca. 50 Å) to prevent charging. The SEM was operated at an accelerating voltage of 5 kV and a working distance of about 10 mm.

Thermal Properties.

Differential scanning calorimetry (DSC) was employed to ensure that epoxy samples were fully cured and to determine the glass transition temperature (Tg) of these samples. Epoxy samples (5-9 mg) were placed in hermetically sealed aluminum pans and analyzed in a Q1000 differential scanning calorimeter (TA Instruments). DSC specimens were first heated at a rate of 10° C./min to 300° C. and equilibrated for 5 min to detect the presence of any uncured epoxy and erase any thermal history in the material. The lack of an exothermic curing peak (at about 260° C.) on the first heating trace was taken to indicate a fully cured sample. Specimens were then cooled to 0° C. and heated once more to 300° C. at 10° C./min. The Tg was determined during the second heating run and each value represented an average of three measurements on the same composite. A t-test with a threshold of 0.05 for statistical significance was also utilized to compare the Tg of different composites.

Experimental Determination of Crosslink Density.

The crosslink densities of cured samples were estimated experimentally by measuring the equilibrium storage modulus in the rubbery state (T>Tg) using dynamic mechanical analysis (DMA) combined with the application of rubber elasticity theory. Measurements were conducted while heating specimens (ramping rate=5° C./min) on a RSA-G2 solid analyzer (TA Instruments) between 30 to 200° C. Rectangular strips (50 mm×4 mm×0.5 mm, length×width×thickness) cut from fully cured epoxy plaques were dried in vacuum at room temperature and mounted between tensile fixtures. During each test, a static pretension on the specimen was maintained at 45 g force while applying a sinusoidal strain amplitude of 0.005%. Dynamic tensile storage moduli (E') and tan δ curves are plotted as a function of temperature. The E' value at 180° C. ($E_r$) was used as the equilibrium storage modulus in the rubbery state to determine Mc (see below). The temperature recorded at the peak in the tan δ curve was taken as the Tg.

The density of cured epoxy samples was measured at room temperature using the displacement method in accordance with ASTM D792-91. For the immersion of samples, isopropyl alcohol with a known density of 0.785 g/cm$^3$ was employed. The density of epoxy samples was determined by the equation, $$\rho = \frac{w_a}{w_a - w_i}\rho_i \qquad (4)$$

where $w_a$ is the weight of the sample in air, w is the weight in isopropyl alcohol, and $p_i$ is the density of isopropyl alcohol.

Results and Analyses

Figure 3:
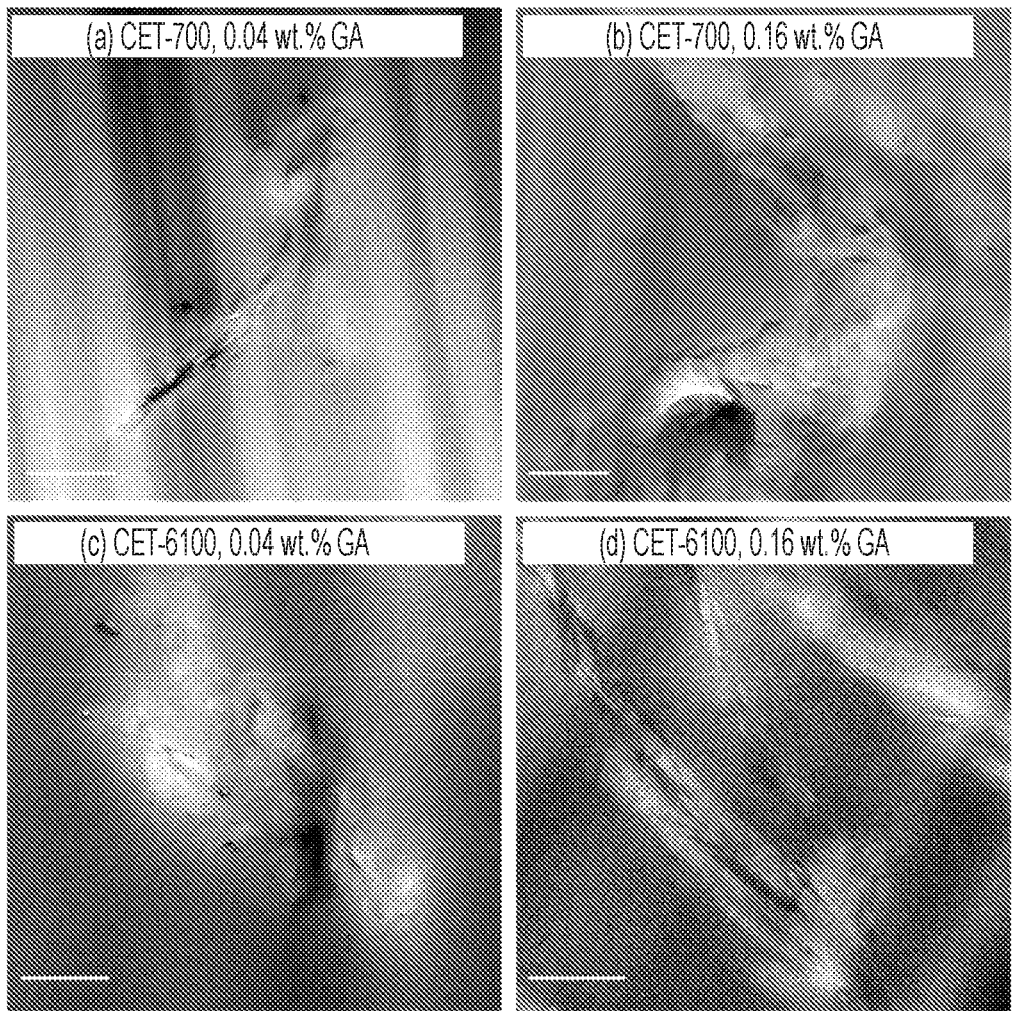
FIG. 3 is representative TEM images of cured GA/epoxy binary composites with the theoretical crosslink density (a, b) Mc=700 g/mol, (c, d) Mc=6100 g/mol. The loading of GA is 0.04 wt. % in (a, c) and 0.16 wt. % in (b, d). Scale bars represent 0.5 µm.

Dispersion of GA in Binary Composites. FIG. 3 shows representative TEM micrographs obtained from fully cured epoxies with different crosslink densities, and different loadings of GA. The presence of reactive amine groups from grafted ATBN chains improves the compatibility and facilitates the interfacial interaction between the graphene particles and the epoxy matrix. At a low loading (0.04 wt. %), the high-aspect-ratio GA particles are well dispersed, as shown in FIGS. 3a and 3c. Dispersed and randomly oriented graphene particles with lateral dimensions in the range of 0.5-2 μm and thicknesses of ~30 nm are found throughout the matrix, without any noticeable particle aggregates or observable debonding at the graphene/matrix interface. Although the number of graphene layers associated with each particle is not discernible due to graphene corrugation, it was speculated that there is some coexistence of single-layered and multilayered GA sheets. The results reveal that the crosslink density of the epoxy matrix does not affect the state of dispersion of GA. At higher GA loading (0.16 wt. %) more graphene nanosheet stacks are apparent (FIGS. 3b and 3d), leading to agglomerates with larger dimensions relative to those in the lower loading composite (FIGS. 3a and 3c). However, based on TEM the overall dispersity is similar to that in other epoxy matrices as reported previously.

Mechanical and Thermal Properties of GA/Epoxy Binary Composites.

Figure 4:
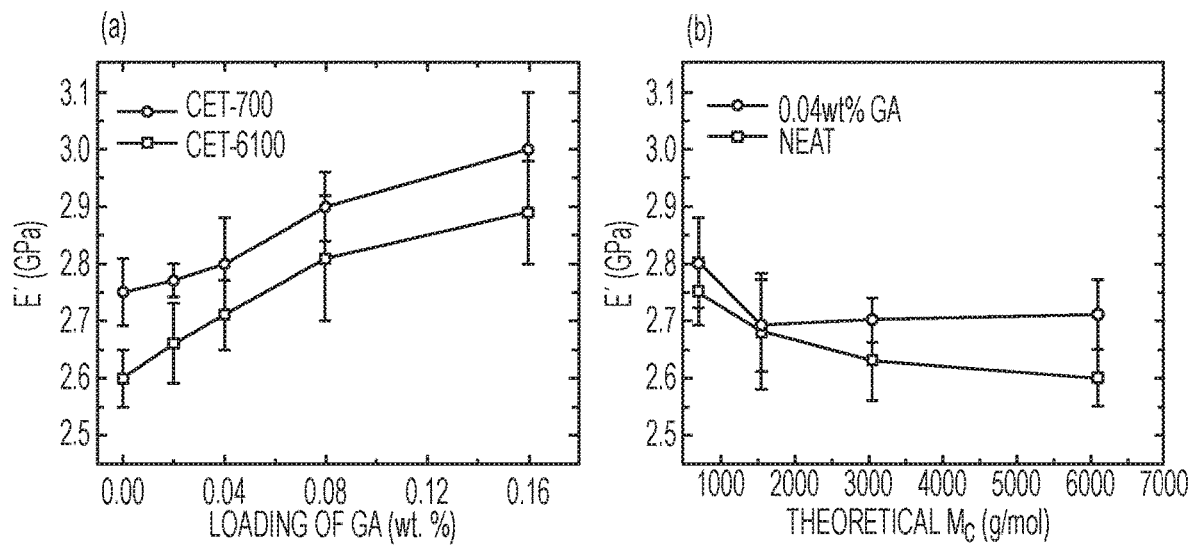
FIG. 4 is plots showing room temperature elastic modulus (E') of GA/epoxy binary composites. (a) E' as a function of the GA loading for the CET-700 and CET-6100 systems; (b) E' as a function of the network theoretical Mc for neat and 0.04 wt. % GA modified epoxies. Solid lines are to guide the eye.
Figure 5:
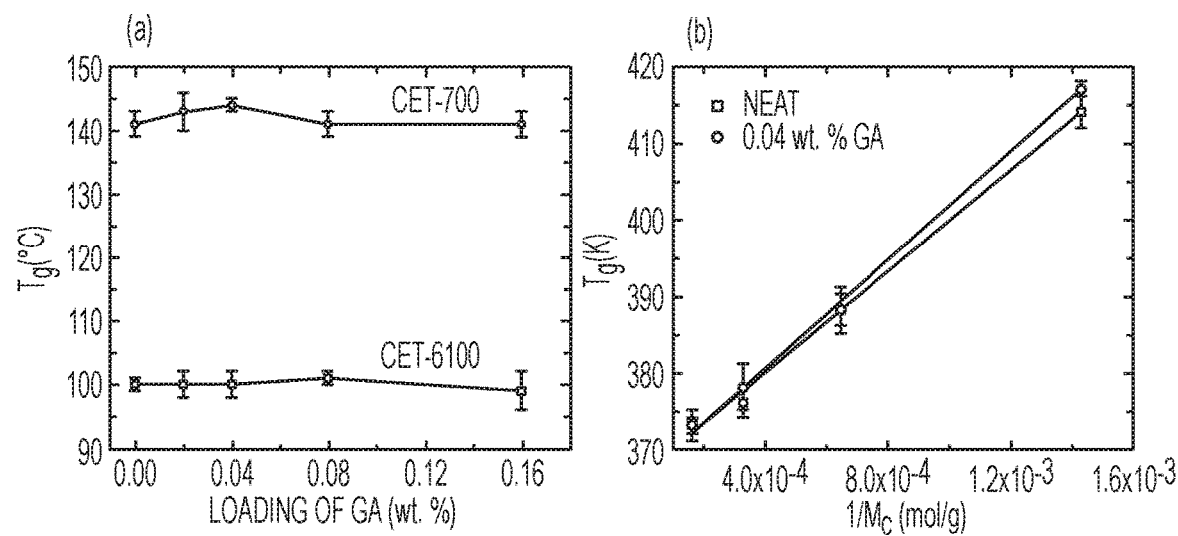
FIG. 5 is plots showing glass transition temperature ($T_g$) of the GA/epoxy binary composites. (a) To as a function of the GA loading for CET-700 and CET-6100 systems; (b) To as a function of the reciprocal of the theoretical Mc for neat and 0.04 wt. % GA modified epoxies. Solid lines in (a) are to guide the eye, but in (b) are the fitting lines of the data according to Equation (5).

FIGS. 4 and 5 summarize the room temperature elastic moduli and glass transition temperatures of neat epoxies and GA/epoxy binary composites at different modifier loadings and matrix crosslink densities. The elastic modulus of the binary composites increases with the loading of GA up to 0.16 wt. %, as shown in FIG. 5a for crosslink densities (theoretical Mc=700 g/mol, CET-700 and 6100 g/mol, CET-6100). The increase is roughly linear over the range of GA loadings investigated. At 0.16 wt. % of GA, the increase in the elastic modulus is about 9% and 11% for the CET-700 and CET-6100 systems, respectively, which is comparable to the reported results in other epoxy composites containing graphene particles. Based on this linear increase in the composite modulus, a simple rule of mixtures has been employed to estimate the effective modulus, $E_{eff}$, of the modifier GA in the CET-700 and CET-6100 systems, and the results show that CET-6100 has a higher $E_{eff}$ value than CET-700.

The elastic modulus of the neat epoxy decreases as the molecular weight between crosslinks ($M_c$) increases, as shown in FIG. 5b. A higher theoretical Mc value corresponds to fewer chemical crosslinks within the network. Consequently, polymer chains are less constrained and relax more readily under applied stress, resulting in a smaller elastic modulus. Likewise, binary composites based on CET-6100 have lower average moduli than corresponding composites based on CET-700 with the same GA loading; however statistically significant differences were only noted for composites with 0.02 wt. % GA. From FIG. 5b, the data for composites containing 0.04 wt. % GA shows that the moduli of these composites is appreciably higher than for the neat epoxy but not significantly affected by $M_c$.

Glass transition temperatures for the GA/epoxy binary composites are presented in FIG. 5. The addition of low loadings of the GA modifier does not significantly affect the Tg of the epoxy matrix, as shown in FIG. 5a. On the other hand, FIG. 5b demonstrates that neat epoxies and 0.04 wt. % GA modified composites both exhibit a≈40° C. decrease in Tg as the network Mc increases from 700 g/mol to 6100 g/mol (1/Mc decreases from 1.4×10−3 mol/g to 1.6×10$^{-4}$ mol/g). Based on the addition and redistribution of network free volume, Ellis et al. proposed a linear relationship between the Tg (in Kelvin) of a network with varying crosslink density and 1/Mc, $$T_g = T_{g,\infty} + \frac{\zeta}{M_c} \quad (5)$$

where $T_{g,\infty}$ is the glass transition temperature (in Kelvin) of the linear polymer backbone at infinite molecular weight and 4 depends on the molecular weight of the unreacted resin and the ratio of incremental free volume contributions from the resin and the curing agent. 72 Linear regression of the experimental data in FIG. 5b gives $T_{g,\infty}$=94° C. and $\zeta$=33 kg·K/mol for the neat epoxy materials, close to the values reported previously for this epoxy resin.68 The 0.04 wt. % GA modified epoxies have $T_{g,\infty}$=94° C. and $\zeta$=35 kg·K/mol, according to the linear fitting results.

Experimental Crosslink Densities of GA/Epoxy Binary Composites.

As described herein, the theoretical Mc values of cured samples are calculated according to Equation (1). The Mc of each sample was estimated by measuring the shear modulus in the rubbery state Gr and relating it to Mc using rubber elasticity theory, $$M_c = \frac{\rho RT}{G_r} \quad (6)$$

where p is the sample density; and R and T are the gas constant (8.314 J/K·mol) and temperature (in Kelvin), respectively. It was estimated the density in the rubbery state (180° C.) based on the combined effects of thermal expansion above and below $T_g$ (thermal expansion coefficients $\alpha_{rubbery} \approx 7.5 \times 10^{-4 \circ}$ C.$^{-1}$, $\alpha_{glassy} \approx 2 \times 10^{-4 \circ}$ C.$^{-1}$) and the measured density at room temperature. Gr is related to the tensile modulus $E_r$ determined by DMA, $$G_r = \frac{E_r}{2(1+v)} \quad (7)$$

where v=0.5 is the Poisson's ratio for a rubber.

Figure 6:
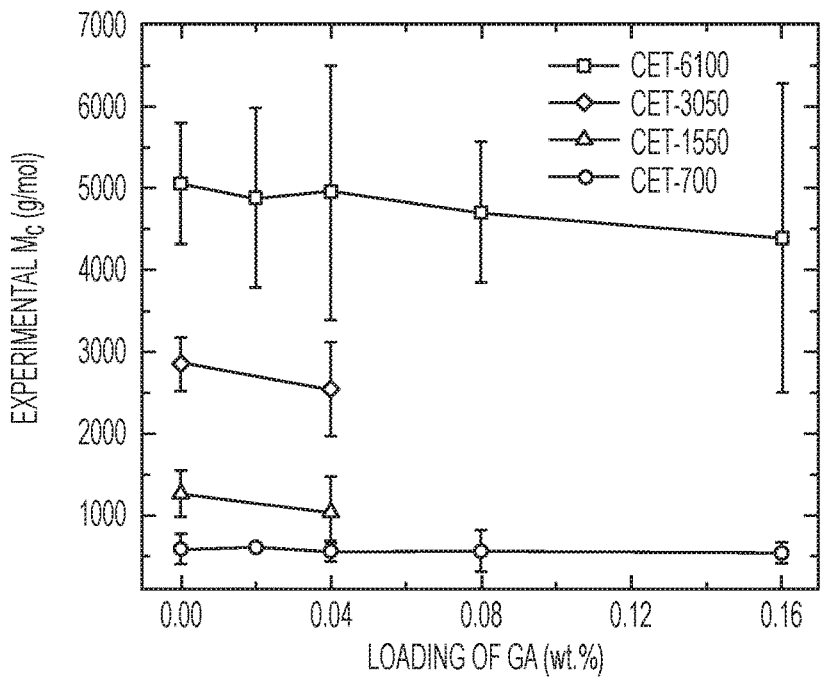
FIG. 6 is a plot of experimentally measured $M_c$ values for the GA/epoxy binary composites as a function of the loading of GA. Legends indicate the theoretical $M_c$ values for different epoxy networks and solid lines are to guide the eye.

FIG. 6 presents the experimental Mc against the loading of GA. There is a modest difference between the theoretical and experimental Mc values, which is not surprising given the assumptions associated with both calculations. All GA/epoxy binary composites follow a similar trend, where the experimental Mc values decrease slightly with increasing loading of GA. This may be due to a reaction between the amine groups from the grafted ATBN chains on the GA particles and the epoxy monomer, which imparts more crosslinks to the network and results in a lower average molecular weight between crosslinks. However, the effect of GA on the crosslink density is not statistically significant.

Fracture Toughness of GA/Epoxy Binary Composites.

Figure 7:
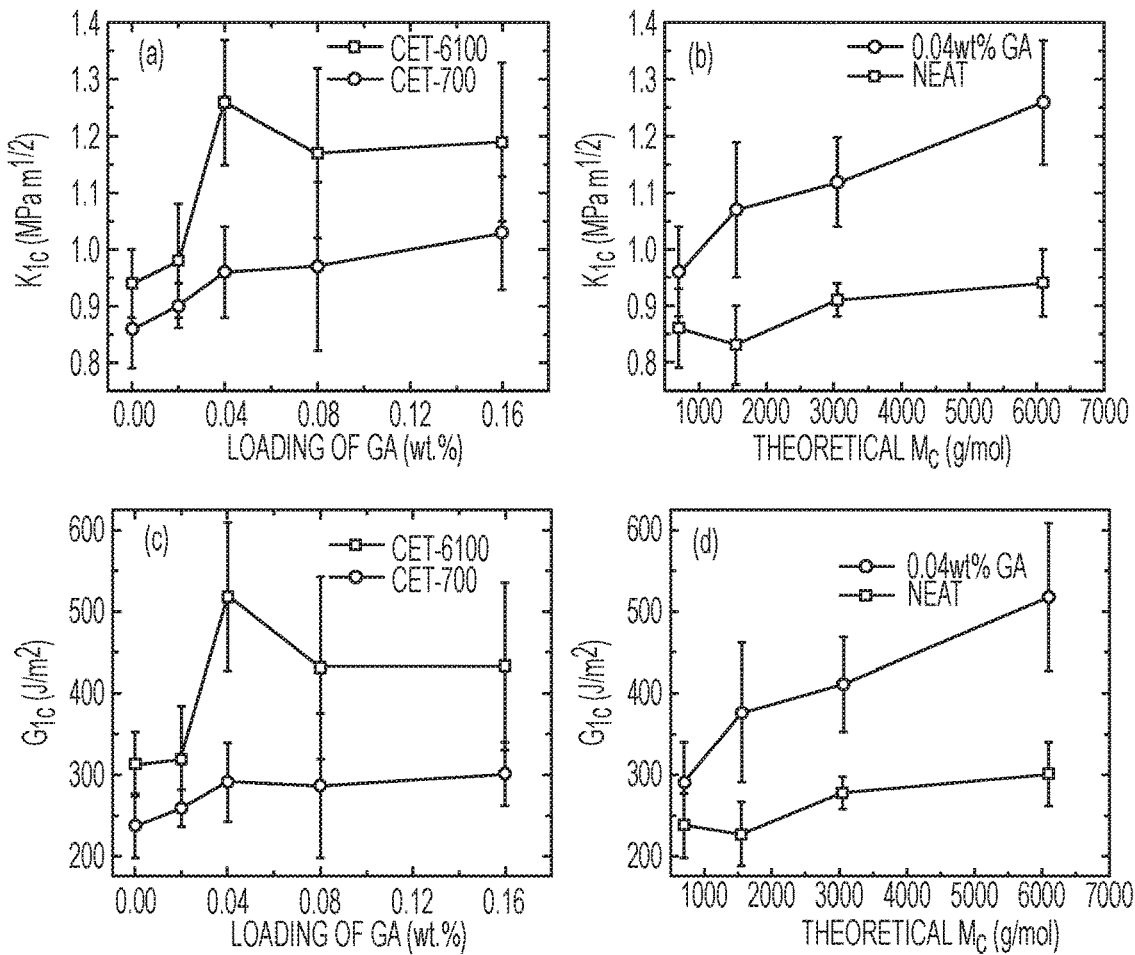
FIG. 7 is plots showing (a, b) Fracture toughness $K_{Ic}$ and (c, d) critical strain energy release rate $G_{Ic}$ for the GA/epoxy binary composites. (a, c) $K_{Ic}$ or $G_{Ic}$ as a function of the GA loading for the CET-700 and CET-6100 systems; (b, d) $K_{Ic}$ or $G_{Ic}$ as a function of the network theoretical $M_c$ for neat and 0.04 wt. % GA modified epoxies. Solid lines are to guide the eye.

In FIG. 7, the fracture toughness and critical strain energy release rate of GA/epoxy binary composites are plotted against the loading of GA and the theoretical Mc of the matrix. For both the CET-6100 and CET-700 systems, the $K_{Ic}$ and $G_{Ic}$ values increase with GA loading up to 0.04 wt. %, then within experimental uncertainties, plateau, as displayed in FIGS. 7a and 7c. It is evident that the CET-6100 system exhibits a greater toughening effect than CET-700. In the CET-6100 system, 0.04 wt. % GA gives a 1.3-fold increase in $K_{Ic}$ and a corresponding 1.7-fold increment in $G_{Ic}$, relative to unmodified epoxies. This significant improvement in fracture toughness is close to results reported for a different epoxy resin toughened by GA particles. $K_{Ic}$ and $G_{Ic}$ both increase linearly with matrix Mc at 0.04 wt. % loading of GA (FIGS. 7b and 7d), apparently beyond what happens with the neat epoxy.

Fractographs of Neat Epoxies and GA/Epoxy Binary Composites.

Figure 8:
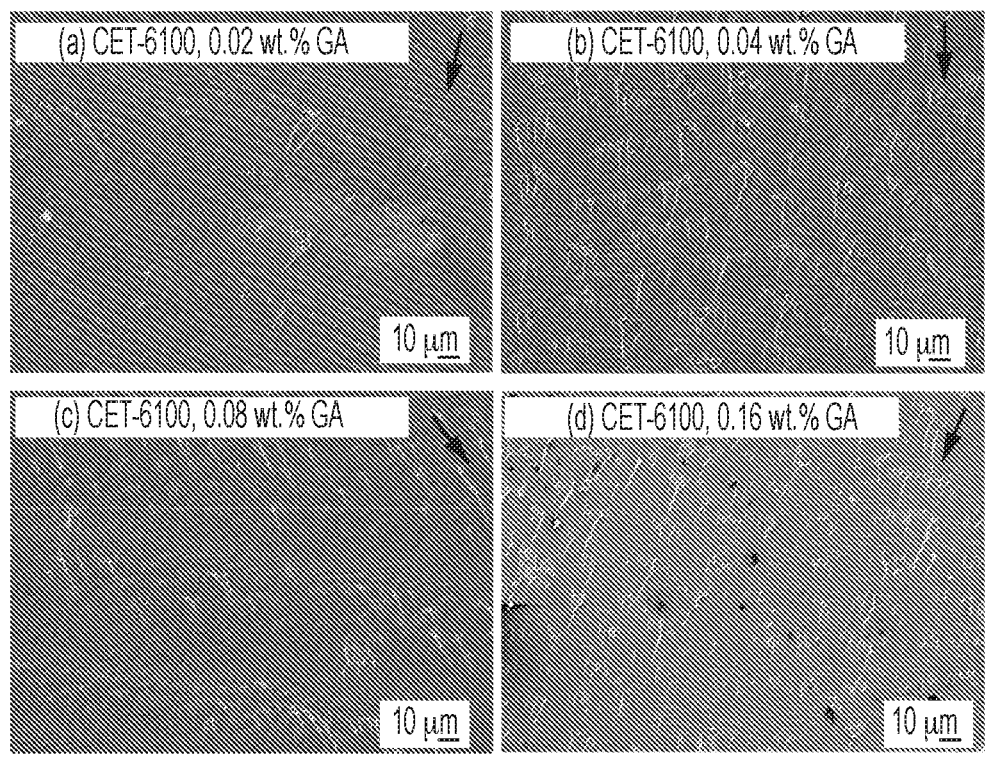
FIG. 8 is representative SEM images of the GA/epoxy binary composites with different loadings of GA for the CET-6100 system: (a) 0.02 wt. %, (b) 0.04 wt. % GA, (c) 0.08 wt. % and (d) 0.16 wt. %. White arrows indicate the crack propagation direction. The dark arrows denote the crack arrest line within the matrix.
Figure 9:
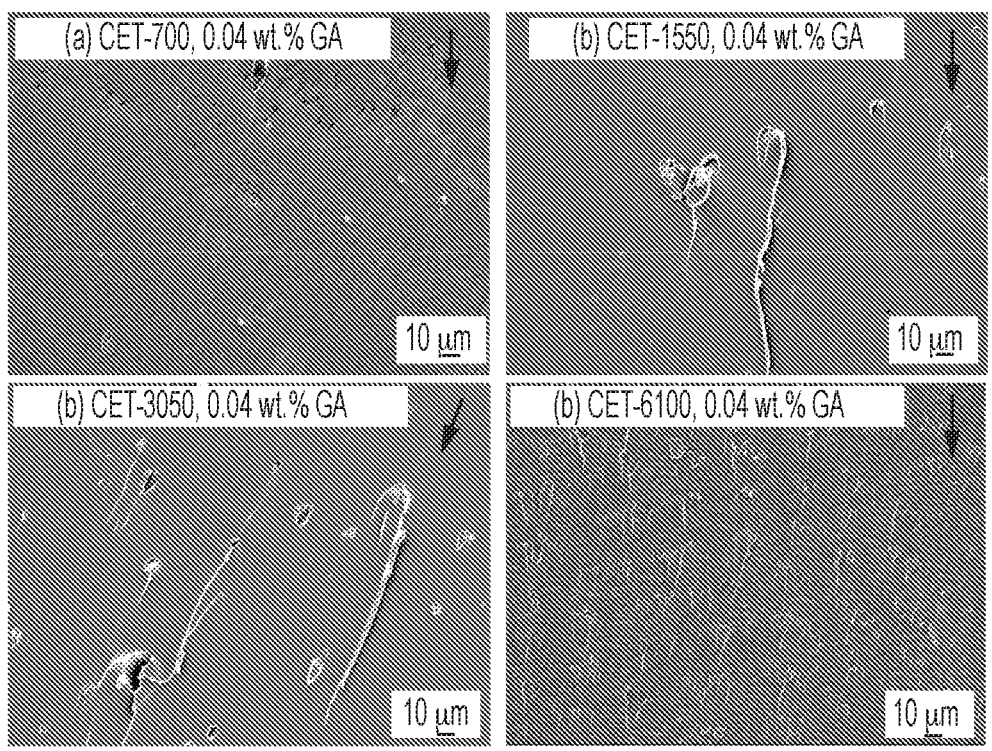
FIG. 9 is representative SEM images of the GA/epoxy binary composites loaded with 0.04 wt. % GA for different epoxy systems: (a) CET-700, (b) CET-1550, (c) CET-3050 and (d) CET-6100. White arrows indicate the crack propagation direction. The dark arrow in (d) denotes the crack arrest line within the CET-6100 matrix.

Representative SEM micrographs showing the fracture surfaces of broken compact tension specimens are presented for neat epoxies and binary GA/epoxy composites in FIGS. 8 and 9. In neat epoxies with different crosslink densities, the fracture surfaces in the region of rapid growth are very smooth with no apparent plastic deformation, consistent with the brittleness of these materials. However, very fine lines perpendicular to the direction of crack propagation (indicated by the white arrows) are distributed throughout the fracture surface of the neat CET-6100 as well as on the GA/epoxy composites prepared with CET-6100 (FIG. 8 and FIG. 9d). These features may be crack arrest lines, and each line is actually an extended band with an average width of ~5 μm under higher magnification. In this region, marks with irregular lips are caused by the material being peeled, indicating the occurrence of a ductile fracture and "slow" crack growth. The areas between the lines are featureless and relatively smooth and a brittle fracture and fast crack growth occur in these regions. The presence of arrest lines typically reveals a stick/slip mode for the crack propagation yet no indication of this sort of propagation was found in the load vs. displacement data. Moreover, Ravetti et al. observed similar fracture markings on polycarbonate specimens impacted under different testing conditions, and the width of arrest lines was found to have a direction correlation with the material toughness. However, certain neat epoxies described herein with different crosslink densities have similar fracture toughness (see FIGS. 7b and 7d). Hence, the unique features on the fracture surface of CET-6100 indicates an intrinsic difference from the more densely crosslinked counterparts, but the origin of these marks is not clear.

Additional features appear on the fracture surfaces of GA/epoxy composites. In FIG. 8, rough features aligned in the direction of crack propagation appear. With increasing GA content, the number of features per unit area (i.e., number density) increases. Therefore, the presence of these features is connected to the measured fracture toughness, which increases with GA content (FIGS. 7a and 7c). The size and number density also are affected by the network $M_c$ (see FIG. 9), a factor which has a strong effect on $K_{Ic}$ and $G_{Ic}$ (FIGS. 7b and 7d). Based on higher magnification micrographs, the origin of these features appears to be delamination between the GA particles and the matrix.

Dispersion of GA and OP Micelles in Ternary Composites.

Figure 10:
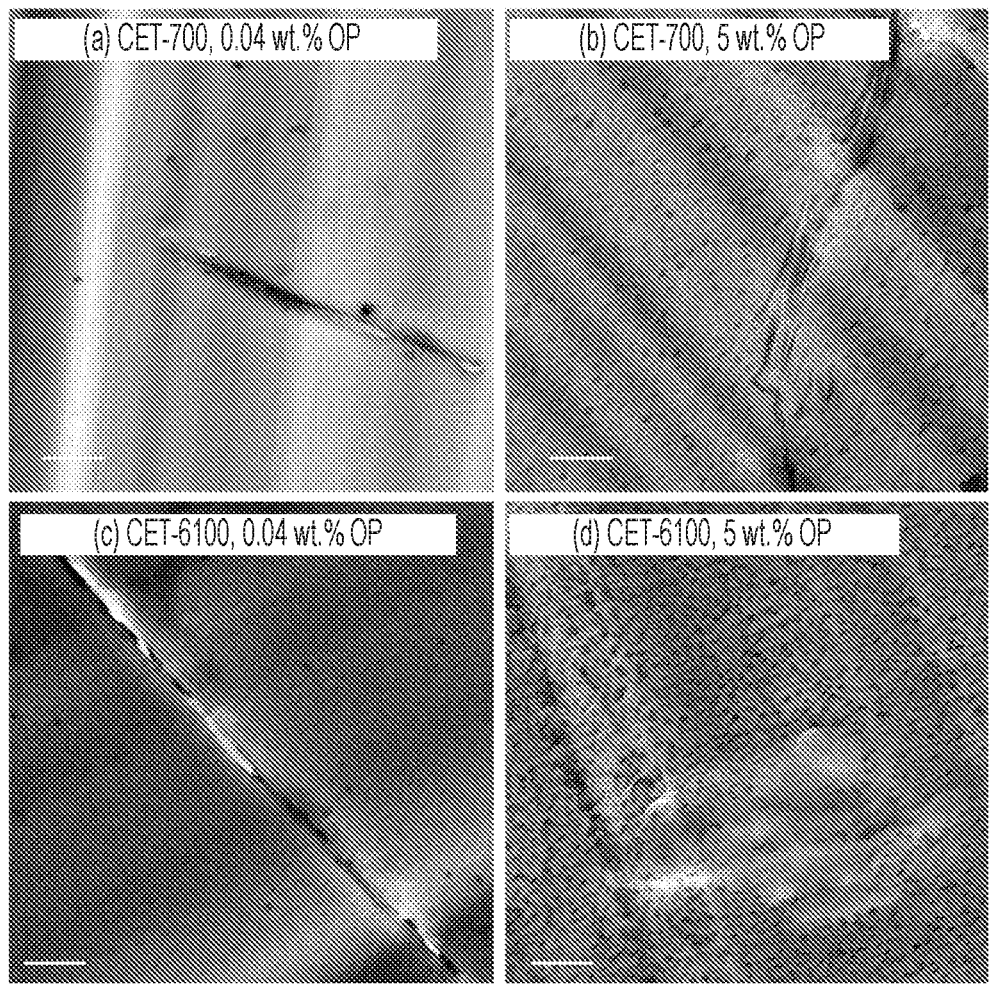
FIG. 10 is representative TEM images of the GA/OP/epoxy ternary composites for the (a, b) CET-700 and (c, d) CET-6100 systems. The loading of GA is 0.04 wt. % in all cases, and the loading of OP is 0.04 wt. % in (a) and (c), and 5 wt. % in (b) and (d). $RuO_4$, used as a contrast agent, preferentially stains the PEO/epoxy interface, making relatively brighter PEP cores with darker PEO coronas. Scale bars represent 0.5 µm.

Considering the good toughening effect in binary composites with low GA loadings, the GA loading was kept at 0.04 wt. % but varied the block copolymer OP loading in GA/OP/epoxy ternary composites. FIG. 10 shows representative TEM images of cured ternary composites. In all cases, the dispersion of GA particles is similar to that in the binary composites, and the diblock OP self-assembles into well-dispersed spherical micelles composed of a PEO corona and PEP core. This nanostructure closely resembles that reported in previous work with this epoxy system and block copolymer. In the CET-700 matrix, at both 0.04 wt. % and 5 wt. % OP addition, the OP micelles are spheres with narrowly distributed diameters of 38±9 nm (FIG. 10a) and 35±6 nm (FIG. 10b). In the CET-6100 matrix, the sphere size is slightly different, 31±8 nm (FIG. 10c) and 32±5 nm (FIG. 10d) in diameter. Another important conclusion from TEM is that the two modifiers do not exhibit any observable interaction, and their coexistence does not interfere with each other in terms of dispersity, particle shape and dimension. This is actually desirable for the goal of toughening a ternary system containing micron and nano-sized modifiers.
Mechanical and Thermal Properties of GA/OP/Epoxy Ternary Composites.

Figure 11:
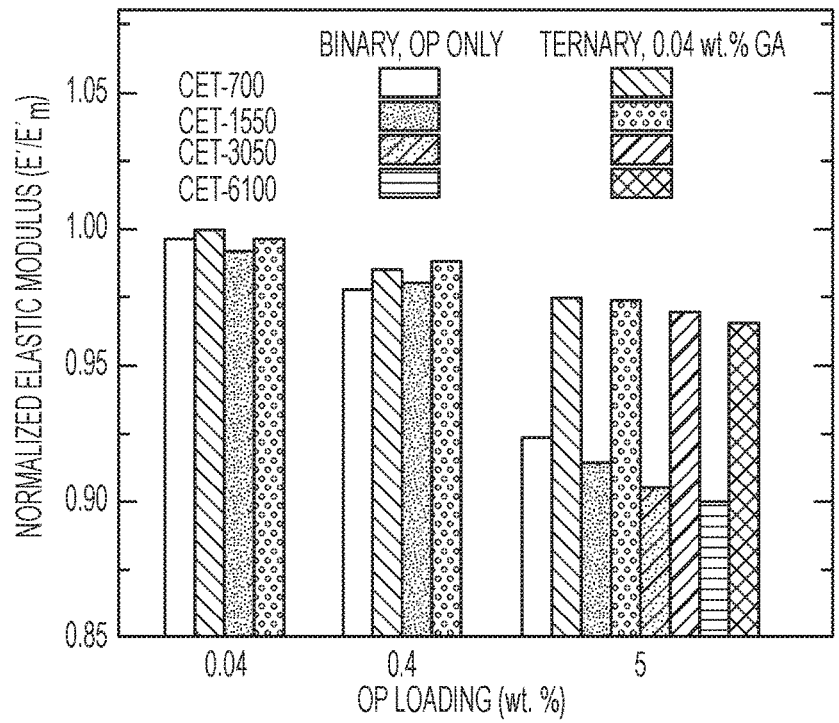
FIG. 11 is a plot of normalized elastic modulus (E') of the OP/epoxy binary composites and GA/OP/epoxy ternary composites as a function of OP loading. All normalized values are relative to the associated neat epoxy $E'_m$ values. The loading of GA is 0.04 wt. % in all ternary composites, and the loading of OP varies.

FIG. 11 summarizes the room temperature elastic moduli of the GA/OP/epoxy ternary composites with different loadings of OP. The incorporation of low loadings of OP (0.04 and 0.4 wt. %) causes less than 5% decrease in the moduli of the OP/epoxy binary composites for both CET-700 and CET-6100 systems, while the ternary counterparts exhibit almost no sacrifice in the modulus. This effect tends to be more evident for the case of 5 wt. % OP, where the drop in binary composite modulus is around 8% to 10%. The ternary composites exhibit moduli within 97% of the values of the neat epoxy moduli (see FIG. 11). The addition of a small amount of GA effectively compensates for the small loss in stiffness that accompanies addition of the block copolymer.

The glass transition temperatures of the OP/epoxy binary composites and OP/GA/epoxy ternary composites were determined by DSC. There is no statistically significant change in $T_g$ after the addition of any amount of GA or OP modifiers for different epoxy systems. Results also confirm that $T_g$ is virtually unchanged with the addition of modifiers and is mainly a function of the Mc of the epoxy matrix, as characterized by Equation (5).
Experimental Crosslink Densities of GA/OP/Epoxy Ternary Composites.

The crosslink density of the OP/epoxy binary composites and ternary composites was experimentally determined in a similar manner as described above for GA/epoxy binary composites. As the OP loading increases from 0.04 wt. % to 5 wt. %, the experimental Mc value tends to slightly decrease in the binary and ternary composites. However, this effect is small in general, because there are no significant differences in the experimental Mc of neat epoxies and binary and ternary composites.
Fracture Toughness of GA/OP/Epoxy Ternary Composites.

Figure 12:
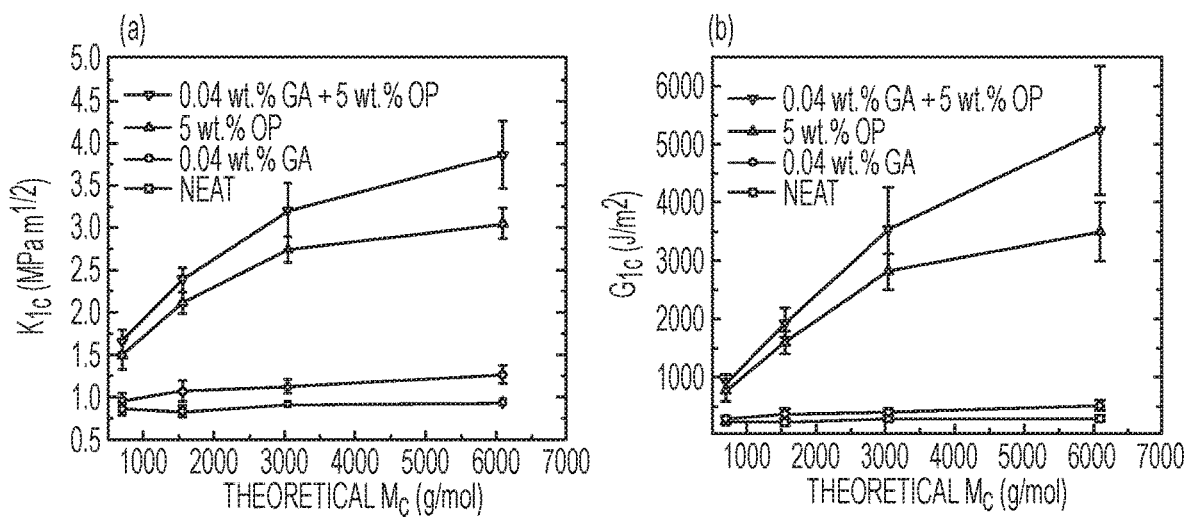
FIG. 12 is plots showing (a) Fracture toughness and (b) critical strain energy release rate as functions of the network theoretical $M_c$. For binary composites, the modifier is either 0.04 wt. % GA or 5 wt. % OP. Ternary composites contain both 0.04 wt. % GA and 5 wt. % OP. Solid lines are to guide the eye.

FIG. 12 shows the fracture toughness ($K_{Ic}$) and critical strain energy release rate ($G_{Ic}$) for the ternary composites containing 5 wt. % OP and 0.04 wt. % GA against the theoretical matrix Mc. Data from binary composites containing either 0.04 wt. % GA or 5 wt. % OP are also shown for comparison. Results show that the block copolymer OP is very effective in toughening the epoxy materials and the toughening effect in the OP/epoxy binary composites also depends on the OP loading. Taking the CET-6100 system as an example, 0.04 wt. % OP only boosts the $K_{Ic}$ of neat CET-6100 resin by ~20%, less than the toughening effect of 0.04 wt. % GA in the GA/epoxy binary composite, while 5 wt. % OP imparts a 320% increase to the $K_{Ic}$ and improves the $G_{Ic}$ by more than an order of magnitude. These toughening results are similar to the values from previous studies on this epoxy resin containing OP spherical micelles.

FIG. 12 shows that the ternary composites exhibit increasing $K_{Ic}$ and $G_{Ic}$ with increasing theoretical Mc, similar to both types of binary composites. Saturation of the improvement in the OP/epoxy binary composites at $G_{Ic} \approx 2800$ J/m² above Mc of 3050 g/mol is consistent with previous studies on the same epoxy resin system. At $M_c$ of 6100 g/mol, the ternary composite has extraordinary mechanical properties with $G_{Ic}$ reaching≈5300 J/m² and a modest elastic modulus of 2.5 GPa. This result exceeds any previously reported toughness for this epoxy resin.

Figure 13:
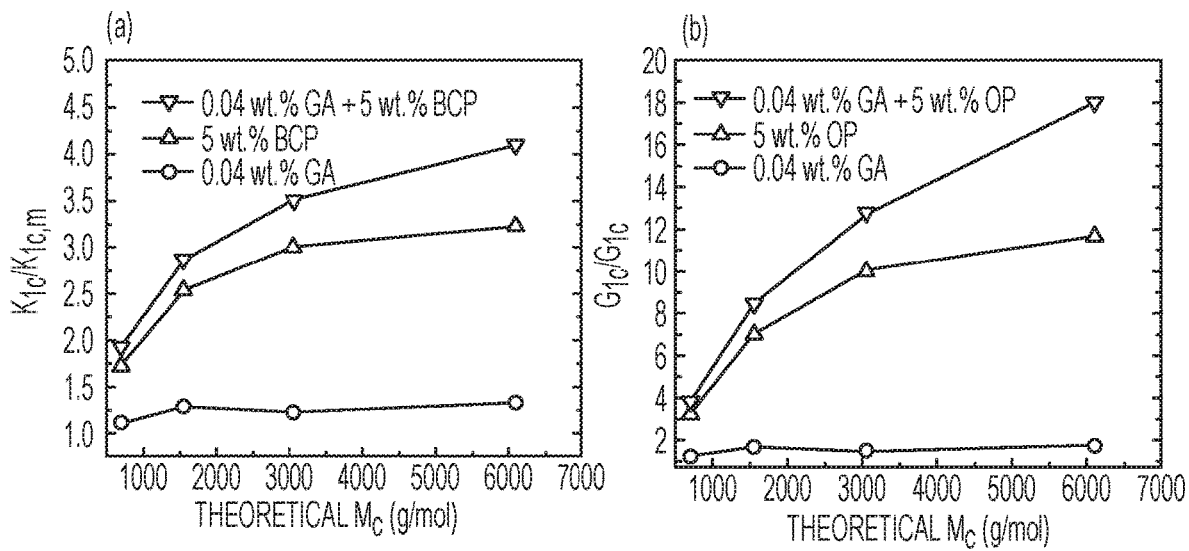
FIG. 13 is plots showing (a) Normalized fracture toughness and (b) normalized critical strain energy release rate as functions of the epoxy theoretical Mc. All normalized values are relative to the associated neat epoxy $K_{Ic,m}$ and $G_{Ic,m}$. For binary composites, the modifier is either 0.04 wt. % GA or 5 wt. % OP. Ternary composites contain both 0.04 wt. % GA and 5 wt. % OP. Solid lines are to guide the eye.

FIG. 13 displays the normalized $K_{Ic}$ and $G_{Ic}$ relative to that of associated neat epoxy matrices ($K_{Ic,m}$ and $G_{Ic,m}$), based on the data shown in FIG. 12 There is a compound toughening effect in ternary composites and it becomes more evident as the matrix Mc increases. At $M_c$ of 3050 g/mol, the ternary composite increases $G_{Ic}$ by 12 times relative to the neat epoxy while the OP/epoxy and GA/epoxy binary composites provide a 9-fold and 1.5-fold increases, respectively. At $M_c$ of 6100 g/mol, the enhancement in ternary composite goes up to 18-fold while the boosts are 12-fold and 1.7-fold in the OP/epoxy and GA/epoxy, respectively.
Fractographs of GA/OP/Epoxy Ternary Composites.

Figure 14:
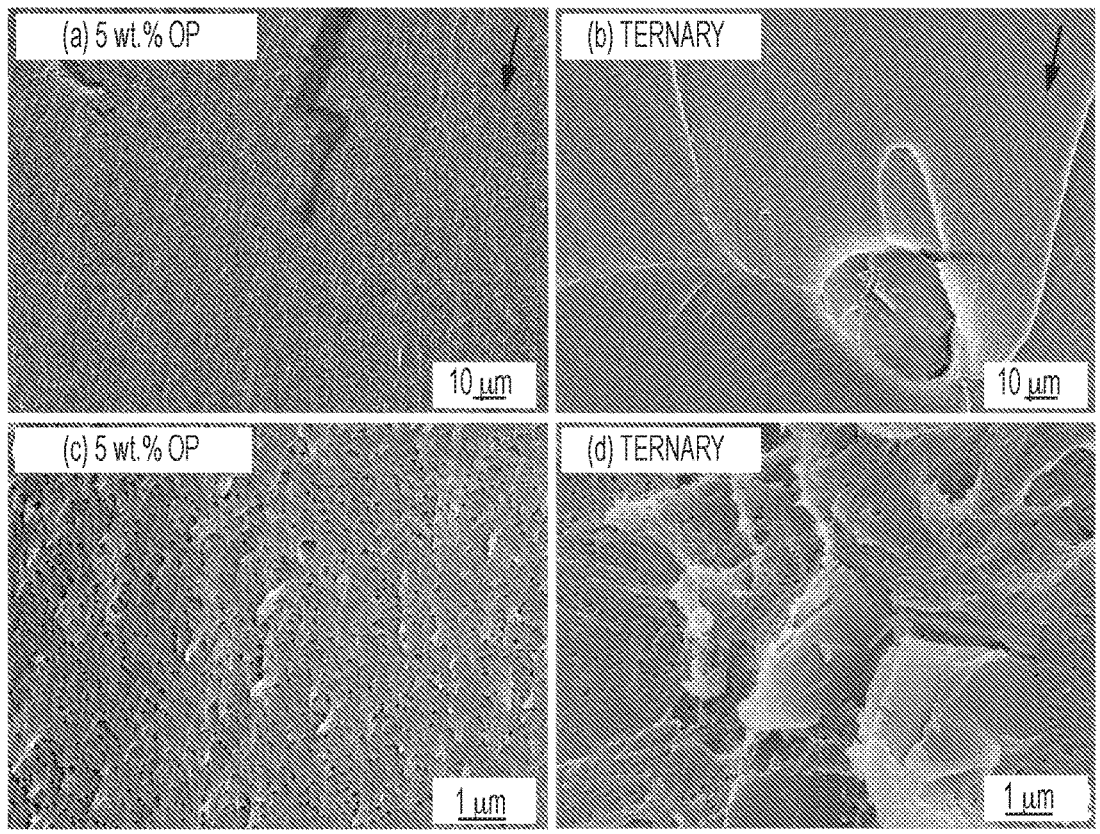
FIG. 14 is SEM fractographs of (a, c) OP/epoxy binary composites with 5 wt. % OP; (b, d) GA/OP/epoxy ternary composites with 0.04 wt. % GA and 5 wt. % OP. The epoxy network is the CET-6100 resin in all cases. The white arrows in (a, b) indicate the direction of crack propagation. The dark arrows in (d) denote the GA particles. The red circles in (c, d) highlight the micelle holes.

Representative SEM images comparing the fracture surfaces of the OP/epoxy binary and OP/GA/epoxy ternary composites for the CET-6100 system are presented in FIG. 14. The fracture surface topographies for GA/epoxy binary composites have been provided in FIGS. 8 and 9. At the lowest magnification, the fractographs are remarkably different: from the neat epoxy to 0.04 wt. % GA/epoxy binary composite, and 5 wt. % OP/epoxy binary composite to the ternary composite, the surface becomes rougher and more textured. The fracture surface of the ternary composite shows a leaf-like pattern that breaks the surface into small domains with an average diameter of ≈140 μm, indicating the occurrence of massive plastic deformation. By comparison, the OP/epoxy binary composite shows a more "continuous" fracture surface with less roughness and texture.

FIG. 14 presents the fine features of the fracture surfaces at higher magnifications. FIG. 14a shows that the OP/epoxy binary composite is characterized by a relatively smooth surface with dispersed sub-100 nm holes, caused by the cavitation and pullout of rubbery core spherical micelles (as highlighted by the red circle in FIG. 14c). These features have also been observed previously in many epoxy materials toughened with spherical micelles. On the other hand, FIG. 14b shows that in the ternary composites, at the boundaries between the leaf-like structures there are aligned features similar to those observed on GA/epoxy fracture surfaces. In a further magnified image, FIG. 14d exhibits a stack of GA layers with an orientation probably perpendicular to the crack propagation direction, revealing some evidence for interlayer separation and layer breakage within the stack, which are believed to dissipate energy and enhance the fracture toughness. In this image the micelle holes are still evident in the matrix and the ones in the region close to GA particles appear to be stretched (highlighted by the red circle), compared to the ones highlighted in FIG. 14c. This suggests the micelles located in the region near the GA particles may be subject to some extra stress field, compared to the micelles in an OP/epoxy binary composite.

DISCUSSION

This section provides insights into the effects of modifier loading and epoxy network crosslink density on the fracture toughness of binary and ternary composites. The toughening mechanisms for the GA/epoxy binary composites are discussed first, followed by the exploration of the synergistic toughening effects in the GA/OP/epoxy ternary composites.
Toughening Mechanisms for GA/Epoxy Binary Composites.

Crack pinning and crack deflection have been proposed as the major toughening mechanisms in graphene modified epoxies. The rough features observed on the fracture surfaces provided in FIGS. 8 and 9 are consistent crack pinning by rigid GA particles and crack deflection. Further, at higher magnification it appears that there has been debonding and void formation at the particle/matrix interface, indicating an additional contribution to the toughness. As noted in previous work,43 grafted ATBN rubber chains can store elastic energy and covalent bonding with the matrix further increases the energy dissipation to form delamination. The effects of GA loading, and the crosslink density of the epoxy matrix on the toughness merit further discussion.

First, the increase in $K_{Ic}$ and $G_{Ic}$ with the GA loading is less steep after 0.04 wt. %, as shown in FIGS. 7a and 7c. A similar phenomenon has been previously reported in a different epoxy resin containing GA particles. As the loading of GA increases, there are clearly more observable crack pinning sites (FIG. 8), which indicate a growing toughening effect; however, at loadings higher than 0.04 wt. %, the crack pinning sites are closer to each other. This proximity may lead to coalescence of secondary cracks formed around the particles, which would facilitate propagation of the primary crack and lessen the crack resistance of the binary composites. This suggests a diminishing impact on toughness with increasing GA loading.

Second, the matrix crosslink density apparently determines the toughening efficacy of the GA particles. As shown in FIGS. 7b and 7d, the $K_{Ic}$ and $G_{Ic}$ increase roughly linearly with theoretical Mc. The fracture surfaces reveal different micromechanical mechanisms. FIG. 9a shows that the aligned features, sometimes called "tail markings", around the GA particles are very short and less evident, suggesting that the modifier has weak interactions with the primary crack in the densely crosslinked CET-700 matrix. As the matrix $M_c$ increases, the markings become longer and the number density of visible crack-pinning sites also increases from FIG. 9b to 9d. This indicates more crack pinning and deflection due to the presence of the GA particles with increasing Mc.

Similar to the well-known trend observed in rubber-modified epoxies, several rigid particle modified epoxy systems exhibit increased toughness as matrix ductility rises. While not wishing to be bound by any specific theory, such toughness enhancement has been attributed to additional debonding and shear yielding in the matrix. It is also believed that the ductility of the epoxy matrix is controlled by two independent factors: the crosslink density and the intrinsic rigidity of the backbone. The studies cited herein usually adjust the matrix ductility by changing the epoxy resin components, so the findings are actually subject to the combined effects of these two factors.

With an epoxy system neither the ductility nor backbone rigidity (i.e., chemistry) of the neat resin are altered as $M_c$ is varied. While not wishing to be bound by any specific theory, it is speculated that the change in toughness with Mc in the GA/epoxy binary composites involves molecular level events related to the mobility and relaxation of polymer chain segments between crosslinks when stressed. For example, with increasing Mc the matrix modulus drops slightly, leading to larger amounts of deformation of the matrix near the rigid particle-matrix interface, which facilitates debonding. Additional studies may be needed to resolve this issue.

Synergistic Toughening in GA/OP/Epoxy Ternary Composites.

Composites were analyzed based on CET-700 and CET-6100 with 0.04 wt. % GA to assess the synergistic toughening effect in the ternary composites as shown in FIG. 13. To show the relative increase, the value of fracture toughness ($K_{Ic}$) for the composite is compared and normalized to that of the neat epoxy ($K_{Ic,m}$):

$$\Delta K_{Ic} = \frac{K_{Ic} - K_{Ic,m}}{K_{Ic,m}} \tag{8}$$

Figure 15:
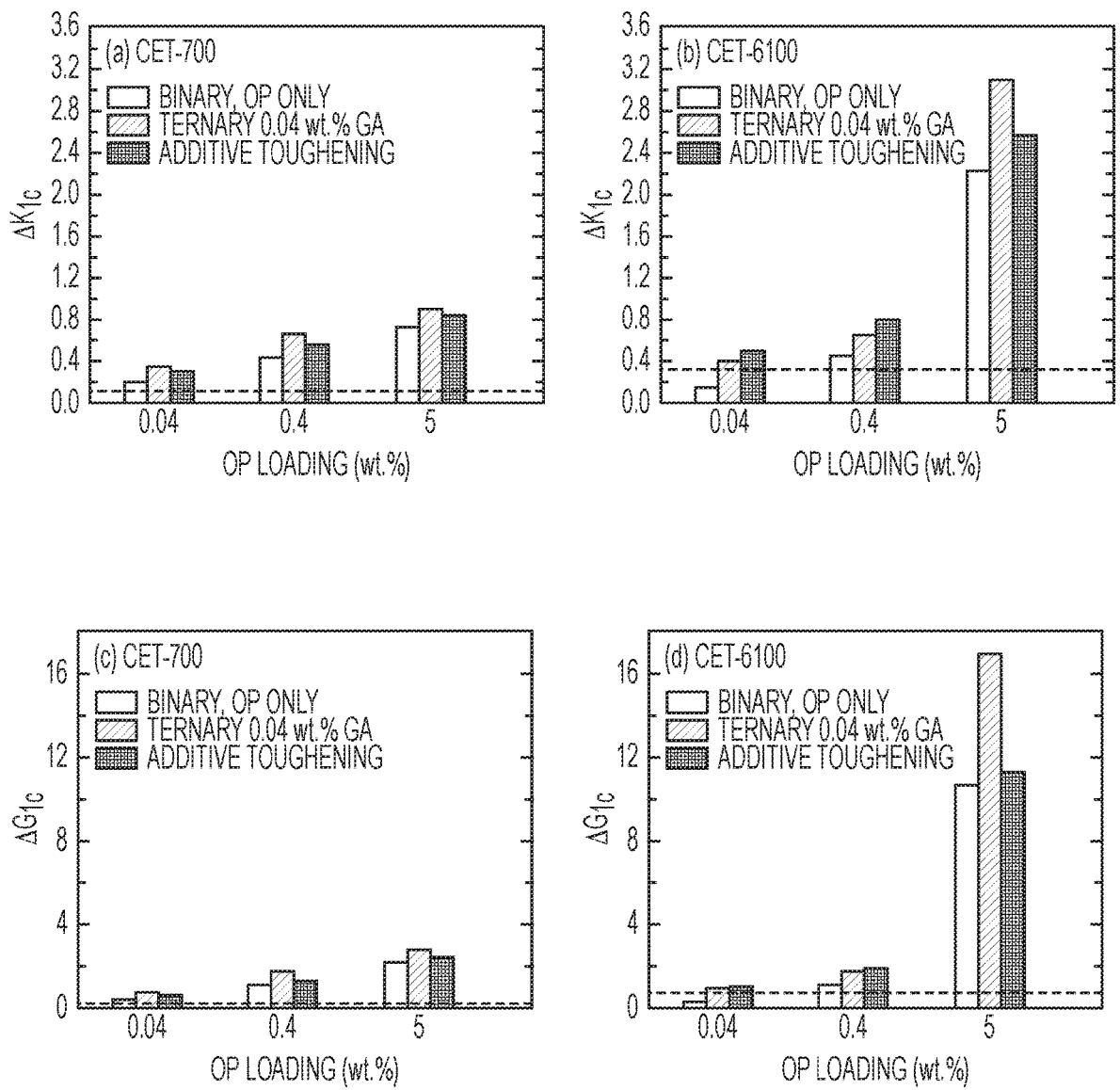
FIG. 15 is plots showing (a, b) $\Delta K_{Ic}$ and (c, d) $\Delta G_{Ic}$ as functions of the OP loading for the CET-700 (a, c) and CET-6100 (b, d) systems. $\Delta K_{Ic}$ and $\Delta G_{Ic}$ are defined according to Equation (8). The dotted lines denote the $\Delta K_{Ic}$ and $\Delta G_{Ic}$ values for GA/epoxy binary composites containing 0.04 wt. % GA. For ternary composites, the GA loading is kept constant at 0.04 wt. % in all cases. The estimated values for additive toughening (blue columns) are based on Equation (9).

Likewise, the critical strain energy release rate ($G_{Ic}$) is compared and normalized to that of the neat epoxy ($G_{Ic,m}$) in the parameter $\Delta G_{Ic}$, which is defined analogously to Equation (8). A positive value of $\Delta K_{Ic}$ ($\Delta G_{Ic}$) indicates a toughening effect in the composites. FIG. 15 displays the $\Delta K_{Ic}$ and $\Delta G_{Ic}$ values for the binary and ternary composites against the loading of block copolymer, OP.

For both epoxy systems, the $\Delta K_{Ic}$ and $\Delta G_{Ic}$ for the OP/epoxy binary composites increases dramatically with the OP loading. To reveal the combined toughening effects of GA and OP, the "additive toughening" values were estimated for the ternary composites according to the modified Kitagawa's model, $$\Delta K_{ter} = \Delta K_{GA} + \Delta K_{OP} \tag{9}$$

where K is short for $K_{Ic}$ and the definition of $\Delta K$ still follows Equation (8); the subscripts, ter, GA, OP stand for ternary composite, GA/epoxy and OP/epoxy binary composite, respectively. This model is based on a simple rule of mixtures.

The additive toughening values for the ternary composites calculated from Equation (9) are shown as the blue columns in FIG. 15. Synergistic toughening is typically defined as toughening that exceeds the amount predicted by an additive model; this comparison is made in FIG. 15. In the CET-700 system with 0.04 wt. % GA (FIGS. 15a and 15c), at any OP loading, the actual values of $\Delta K_{Ic}$ and $\Delta G_{Ic}$ for the ternary composites exceed the additive values; however, the synergy is small and the absolute values of $K_{Ic}$ and $G_{Ic}$ for these composites are modest. On the other hand, in the CET-6100 system (FIGS. 15b and 15d), at low OP loadings, the actual values of $\Delta K_{Ic}$ and $\Delta G_{Ic}$ for the ternary composites are close to the additive values, but at 5 wt. % of OP loading the actual values are much higher than the estimated additive ones. These results suggest that the two types of modifiers function simultaneously without interfering with each other. In fact, for the case of CET-6100 the combination of 0.04 wt. % GA and 5 wt. % OP shows the largest synergistic effect.

Table 1 briefly summarizes the synergistic toughening effects reported in the recent literature for ternary composites modified by rigid and soft additives. For each reference, only the largest toughness improvement observed in the composites is listed in the table. According to the results, synergy is usually more prominent in systems containing modifiers that have a large discrepancy in dimensions (e.g. silica nanoparticles of =20 nm diameter with micron-size CTBN liquid rubbers, or micro-size organoclay agglomerates with nanoscale block copolymer particles). GA/OP/epoxy ternary composites also follow this trend. The $\Delta K$ of the CET-6100 ternary composites exhibits a 21% increase over the additive toughening based on Equation (9). While there is one other study with a higher increase, the composites reported here develop high toughness at the lowest modifier loading, compared to the literature. Results show that the combination of the two or the best additives from each category (block copolymer micelles for the soft additive and microscale graphene for the rigid additive) indeed produces outstanding synergy in the ternary composites, especially in an epoxy matrix with low crosslink density.

TABLE 1

Summary of the maximum synergistic toughening effect in epoxy-based ternary composites.

| | Modifier type, size and loading | | $^a\Delta K_{Ic}$ | | | | | $^b\Delta G_{Ic}$ | | | | |
|---|---|---|---|---|---|---|---|---|---|---|---|---|
| Reference | Rigid additive | Soft additive | Rigid binary | Soft binary | $^c$Additive toughening | Ternary | Synergy (%)$^d$ | Rigid binary | Soft binary | $^c$Additive toughening | Ternary | Synergy (%)$^d$ |
| This work | GA, 0.04 wt. % | OP, 5 wt. % | 0.34 | 2.24 | 2.58 | 3.11 | 21% | 0.72 | 10.7 | 11.4 | 16.5 | 45% |
| | Silica NP, d ~20 nm, 14.8 wt. % | CTBN, 9 wt. % | 1.19 | 0.88 | 2.07 | 2.71 | 31% | 2.94 | 3.31 | 6.25 | 13.4 | 114% |
| | Silica NP, 20 nm, 5 wt. % | CTBN, 18 wt. % | 0.65 | 1.38 | 2.03 | 2.09 | 3% | — | — | — | — | — |
| | Silica sphere, 5 μm, 30 vol. % | PMMA-PBA diblock copolymer, 5 phr | 0.88 | 0.44 | 1.32 | 1.38 | 5% | — | — | — | — | — |
| | Silica NP, 20 nm, 15 wt. % | CTBN, 9 wt. % | 0.63 | 1.84 | 2.47 | 2.51 | 2% | 1.48 | 7.71 | 9.19 | 11.5 | 25% |
| | Silica NP, 20 nm, 10 wt. % | CTBN, 10 wt. % | 0.52 | 0.73 | 1.25 | 1.28 | 2% | 1.03 | 2.35 | 3.38 | 4.49 | 33% |
| | Interclated organoclay, agglomerates <1 μm, 5 wt. % | PPO-PEO diblock, 50-200 nm, 10 wt. % | 0.59 | 0.91 | 1.50 | 1.60 | 7% | — | — | — | — | — |
| | Organoclay, agglomerates <1 μm, 6 phr | CTBN, 20 phr | 0.72 | 0.55 | 1.27 | 1.14 | −10% | 1.8 | 2.75 | 4.55 | 6 | 32% |
| | Halloysite clusters <1 μm, 10 wt. % | CTBN, 10 wt. % | 0.49 | 0.73 | 1.22 | 1.28 | 5% | 1.09 | 2.35 | 3.44 | 4.72 | 37% |

$^{a,b}\Delta K_{Ic}$ (or $\Delta G_{Ic}$) is defined according to Equation (8). From each reference, only the largest increase in the toughness of the ternary systems has been reported, and the associated modifier loadings are also listed. The toughness values for the binary systems correspond to the composites containing the listed modifier loadings.
$^c$The additive toughening results are estimated based on Equation (9).
$^d$The synergy is defined as the relative difference between the ternary results and the additive toughening results. Specifically, the ternary value is divided by the additive toughening value, then the resultant number subtracts one, followed by multiplying 100.

Toughening Mechanisms in GA/OP/Epoxy Ternary Composites.

Fractography results indicate that additional toughening mechanisms are active in the ternary composites apart from those found in binary composites containing GA particles or OP micelles alone. As the primary crack propagates, the nanoscale micelles in the process zone cavitate under a tri-axial stress state, which promotes the formation of shear bands, facilitating matrix plastic deformation. Shear yielding is reflected in the texture and roughness of the fracture surface. Apart from interacting with micelles, the primary crack encounters graphene particles with different orientations and degrees of exfoliation, leading to interactions that involve crack deflection, layer breakage, interlayer separation as well as debonding around the particles. These interactions create tortuous crack pathways and lead to the micron-sized leaf-like pattern revealed by SEM of the toughest composite. The nanoscale mechanisms associated with the micelles together with the micron-scale mechanisms of the graphene particles combine to produce a compound toughening effect in the ternary composites. Moreover, it has been reported that in some ternary composites, the modifiers actually can assist each other to promote toughening. This synergistic effect is evident in the results.

There are several possible scenarios for the origin of this intriguing high synergy in the lightly crosslinked epoxy matrix (CET-6100). First, compared with a OP/epoxy binary composite, the stiff GA particles act as stress concentrators, effectively amplifying the local stress. Consequently, rubber-core micelles close to the GA particles would more readily cavitate. In return, the change in the stress state caused by micelle cavitation leads to a lower driving force for the GA particles to debond with the matrix. This promoted delamination at the interface of a rigid phase and polymer is helpful to further relieve the hydrostatic tensile stress from the matrix, facilitating the matrix plastic deformation. In brief, the toughening efficacy of both modifiers has been boosted at the presence of each other, resulting in the synergy in toughening.

Second, several researchers have proposed that the toughness enhancement in a material filled with particles is directly connected to the interparticle distance. The toughening effect in ternary composites may be attributed to the substantial difference in the interparticle distance of the micron-size GA particles and nanoscaled OP micelles. The interparticle distance τ (surface to surface), shown in Equation (10) for a cubic distribution and ideal dispersion, would dramatically increase with the particle size, $$\tau = d\left[\left(\frac{\pi}{6\Phi_p}\right)^{\frac{1}{3}} - 1\right] \qquad (10)$$

where d is the particle diameter and $\Phi_p$ is the particle volume fraction. In ternary composites containing 5 wt. % OP and 0.04 wt. % GA, τ≈50 nm for the spherical micelles, while τ≈13 μm for the graphene particle (estimated from SEM on the 0.04 wt. % GA/epoxy binary composites). It implies that there is a large amount of intact epoxy between the GA particles left for micelles to trigger shear yielding and matrix dilation. This agrees with Pearson's work, where synergistic toughening effects in epoxies were only obtained with nanoscale silica particles and micron-sized rubber particles but no such effects with comparable-sized rubber nanoparticles and silica nanoparticles. Also, in a recent report, Huang et al. employed micron-sized graphene particles and rubber particles with comparable sizes to toughen epoxies, but their improvement in toughness is not as effective as that in certain ternary composites described herein.

SUMMARY

It has been shown that a ternary graphene/block copolymer/epoxy composite with high elastic modulus and superior fracture toughness can be developed using exfoliated graphene oxide with amine-functionalization (GA) and a poly(ethylene oxide)-b-poly(ethylene-alt-propylene) (OP) diblock copolymer as epoxy modifiers. The dispersion and toughening efficacy of GA was first characterized in binary composites containing this solitary rigid filler. The dispersed GA effectively increased the composite modulus, but did not have significant impact on the Tg and the experimentally measured crosslink density of the epoxy network in the studied loading range. The toughening efficacy of GA was strongly affected by the matrix crosslink density, increasing in the lightly crosslinked matrixes; the largest improvement was 1.7-fold improvement in the critical strain energy release rate ($G_{Ic}$) at the low loading of 0.04 wt. % in the CET-6100 matrix. The toughening mechanisms for GA are believed to be debonding with the matrix and the crack pinning and deflection for the primary crack, according to the fracture surface SEM of binary composites.

Incorporation of 0.04 wt. % GA into epoxies containing different amounts of OP block copolymers created hybrid ternary composites, in which the OP diblock formed well dispersed spherical micelles with a uniform diameter of ≈30 nm. No interactions between GA and OP could be observed under TEM. The elastic moduli of the ternary composites was very close to that of the neat epoxy matrices, unlike OP/epoxy binary composites, in which inclusion of 5 wt. % OP reduced the matrix modulus by ~10%. Moreover, the $T_g$ and experimentally measured crosslink density did not change significantly for the ternary composites. The matrix crosslink density played a critical role in determining the fracture toughness values of ternary composites. All ternary composites, regardless of the crosslink density, exhibited a higher $K_{Ic}$ and $G_{Ic}$ compared to their binary counterparts, but in the matrix with the lowest crosslink density (CET-6100), 5 wt. % OP and 0.04 wt. % GA together drastically improved the $G_{Ic}$ to 18 times that of the unmodified material. This improvement was significantly higher than the increase of 12-fold with just 5 wt. % OP, and even greater than the additive result of a 14-fold increase summed over the improvements in associated binary composites. While not wishing to be bound by any specific theory, the synergistic toughening effect is attributed to the fact that the toughening mechanisms noted for rubbery-core micelles and rigid graphene particles can function simultaneously at different length scales. Furthermore, in ternary composites, the micelle core cavitation and resultant matrix shear yielding can be facilitated by the stress concentration around the GA particles, meanwhile, the toughening effects for GA like debonding can be augmented by the change in stress state accompanying cavitation.

This investigation advances the field of toughening thermoset plastics in three significant ways. Firstly, the concept of developing ternary nanocomposites has been extended to include two new modifiers with a substantial difference in dimensions, which once again proves to benefit a synergistic toughening effect. Secondly, the examples presented herein have the practical merit of providing a feasible and potentially low-cost approach to engineer a superior toughness in epoxy thermosets without losing rigidity. Thirdly, the inclusion of graphene into a polymer matrix offers a platform for producing high-end materials with a host of special characteristics in electric, optical, thermal and mechanical properties.

What is claimed is:

1. A composition comprising:
    an amphiphilic block copolymer in a range of 0.04 wt % to 5 wt % of the composition, the amphiphilic block copolymer comprising:
        at least one epoxy miscible block, comprising at least one poly(alkylene oxide); and
        at least one epoxy immiscible block, wherein the amphiphilic block copolymer forms a substantially spherical micelle;
    a resin material; and
    an amine modified graphene oxide;
    wherein the composition shows a synergic effect in critical strain energy release rate ($GI_c$) value versus predicted value calculated by adding (i) the $GI_c$ value for neat resin material, plus (ii) the difference in $GI_c$ found when adding the amphiphilic block copolymer to the resin material versus the neat resin material, plus (iii) the difference in $GI_c$ found when adding the amine modified graphene oxide to the resin material versus the neat resin material and the composition is free of a bond between the amphiphilic block copolymer and the amine modified graphene oxide.

2. The composition of claim 1, wherein the epoxy immiscible block comprises poly(butylene oxide).

3. The composition of claim 1, wherein the amphiphilic block copolymer has a molecular weight ($M_n$) of from about 1000 to about 30,000.

4. The composition of claim 1, wherein the weight ratio of epoxy miscible block to epoxy immiscible block ranges from 9:1 to 1:9.

5. The composition of claim 1, wherein the amount of amine modified graphene oxide is about 0.04 wt % to about 5 wt % based on the total weight of the composition.

6. The composition of claim 1, wherein the amine modified graphene oxide comprises surface modification with amine-terminated poly(butadiene-acrylonitrile).

7. The composition of claim 1, wherein the amine modified graphene oxide comprises amine-functionalized exfoliated graphene oxide.

8. The composition of claim 1, wherein the block copolymer comprises at least one of poly(ethylene oxide)-b-poly(butylene oxide)(PEO-b-PBO) and poly(ethylene oxide)-b-poly(butylene oxide)-b-poly(ethylene oxide) (PEO-b-PBO-b-PEO).

9. The composition of claim 1, wherein the resin material comprises one or both of epoxy or polyurethane.

10. The composition of claim 1, wherein the resin comprises an epoxy vinyl ester resin comprising the reaction product of (a) a polyepoxide resin; and
    (b) an unsaturated carboxylic acid, or a mixture of an unsaturated carboxylic acid and maleic anhydride.

11. The composition of claim 1, wherein the amine modified graphene oxide is produced by a process comprising (i) reacting graphene oxide with a diisocyanate compound to produce an isocyanate-modified graphene oxide and (ii) reacting the isocyanate-modified graphene oxide with diamine compound to produce the amine modified graphene oxide.

12. The composition of claim 1, comprising:
   about 75 wt % to about 98 wt % resin material;
   about 2 to about 5 wt % amphiphilic block copolymer, and
   about 0.04 wt % to about 5 wt % of amine modified graphene oxide;
   the weight percentages based on the total weight of the composition.

13. A process for producing the composition of claim 1 comprising:
   (a) dissolving an amphiphilic block copolymer in a solvent to produce an amphiphilic block copolymer solution and forming a substantially spherical micelle:
   said amphiphilic block copolymer comprising at least one epoxy miscible block and at least one epoxy immiscible block;
   (b) adding amine-modified graphene oxide to the amphiphilic block copolymer solution to produce a graphene oxide containing mixture;
   (c) mixing a resin component into graphene oxide containing mixture to produce a resin containing mixture; and
   (d) removing the solvent from the resin containing mixture to produce a solvent-free mixture.

14. The process of claim 13, further comprising:
   (e) adding a catalyst to the solvent-free mixture to produce a catalyst-containing mixture;
   (f) adding the catalyst-containing mixture to a mold and heating the catalyst-containing mixture to produce a molded article; and
   (g) removing the molded article from the mold.

15. The process of claim 13, wherein the amine modified graphene oxide comprises surface modification with amine-terminated poly(butadiene-acrylonitrile).

16. The process of claim 13, wherein the amphiphilic block copolymer comprises at least one of poly(ethylene oxide)-b-poly(butylene oxide)(PEO-b-PBO) and poly(ethylene oxide)-b-poly(butylene oxide)-b-poly(ethylene oxide) (PEO-b-PBO-b-PEO).

17. The process of claim 13, wherein the resin material comprises one or both of epoxy or polyurethane.

18. The process of claim 13, wherein the amine modified graphene oxide is produced by a process comprising (i) reacting graphene oxide with a diisocyanate compound to produce an isocyanate-modified graphene oxide and (ii) reacting the isocyanate-modified graphene oxide with a diamine compound to produce the amine modified graphene oxide.

19. The process of claim 13, wherein the solvent free mixture comprises:
   about 75 wt % to about 98 wt % resin material;
   about 2 to about 20 wt % block copolymer; and
   about 0.04 wt % to about 5 wt % of amine modified graphene oxide;
   the weight percentages based on the total weight of the solvent free mixture.

20. The composition of claim 1, comprising a distribution of the substantially spherical micelles, each having a diameter in a range of 29 nm to 47 nm.

* * * * *

UNITED STATES PATENT AND TRADEMARK OFFICE
CERTIFICATE OF CORRECTION

PATENT NO. : 11,180,651 B2
APPLICATION NO. : 16/331025
DATED : November 23, 2021
INVENTOR(S) : Bates et al.

It is certified that error appears in the above-identified patent and that said Letters Patent is hereby corrected as shown below:

On the Title Page

Item [57], Column 2, Line 2, delete "copolymer," and insert --copolymer;-- therefor Item [57], Column 2, Line 4, delete "(Glc)" and insert --($G_{lc}$)-- therefor Item [57], Column 2, Line 5, delete "Glc" and insert --$G_{lc}$-- therefor Item [57], Column 2, Line 6, delete "Glc" and insert --$G_{lc}$-- therefor Item [57], Column 2, Line 9, delete "Glc" and insert --$G_{lc}$-- therefor In the Drawings Sheet 4 of 9, Fig. 7, delete "$K_{1c}$" and insert --$K_{lc}$-- therefor Sheet 4 of 9, Fig. 7, delete "$K_{1c}$" and insert --$K_{lc}$-- therefor Sheet 4 of 9, Fig. 7, delete "$G_{1c}$" and insert --$G_{lc}$-- therefor Sheet 4 of 9, Fig. 7, delete "$G_{1c}$" and insert --$G_{lc}$-- therefor Sheet 7 of 9, Fig. 12, delete "$K_{1c}$" and insert --$K_{lc}$-- therefor Sheet 7 of 9, Fig. 12, delete "$G_{1c}$" and insert --$G_{lc}$-- therefor Sheet 8 of 9, Fig. 13, delete "$K_{1c}/K_{1c,m}$" and insert --$K_{lc}/K_{lc,m}$-- therefor Sheet 8 of 9, Fig. 13, delete "$G_{1c}/G_{1c}$" and insert --$G_{lc}/G_{lc}$-- therefor Signed and Sealed this
Sixth Day of June, 2023

*Katherine Kelly Vidal*
Katherine Kelly Vidal
*Director of the United States Patent and Trademark Office*

CERTIFICATE OF CORRECTION (continued)
U.S. Pat. No. 11,180,651 B2

Sheet 9 of 9, Fig. 15, delete "$\Delta K_{1c}$" and insert --$\Delta K_{Ic}$-- therefor Sheet 9 of 9, Fig. 15, delete "$\Delta K_{1c}$" and insert --$\Delta K_{Ic}$-- therefor Sheet 9 of 9, Fig. 15, delete "$\Delta G_{1c}$" and insert --$\Delta G_{Ic}$-- therefor Sheet 9 of 9, Fig. 15, delete "$\Delta G_{1c}$" and insert --$\Delta G_{Ic}$-- therefor In the Specification In Column 1, Line 12, delete "2017," and insert --2016,-- therefor In Column 1, Line 46, delete "Glc" and insert --$G_{lc}$-- therefor In Column 1, Line 61, delete "($Gl_c$)" and insert --($G_{lc}$)-- therefor In Column 1, Line 62, delete "$Gl_c$" and insert --$G_{lc}$-- therefor In Column 1, Line 63, delete "$Gl_c$" and insert --$G_{lc}$-- therefor In Column 1, Line 65, delete "$Gl_c$" and insert --$G_{lc}$-- therefor In Column 2, Line 47, delete "($Gl_c$)" and insert --($G_{lc}$)-- therefor In Column 3, Line 29, delete "($Gl_c$)" and insert --($G_{lc}$)-- therefor In Column 3, Line 31, delete "($Gl_c$)" and insert --($G_{lc}$)-- therefor In Column 3, Line 32, delete "$Gl_c$" and insert --$G_{lc}$-- therefor In Column 3, Line 33, delete "$Gl_c$" and insert --$G_{lc}$-- therefor In Column 3, Line 35, delete "Gl" and insert --$G_{lc}$-- therefor In Column 3, Line 48, delete "Mc=700" and insert --$M_c$=700-- therefor In Column 3, Line 48, delete "Mc=6100" and insert --$M_c$=6100-- therefor In Column 3, Line 54, delete "Mc" and insert --$M_c$-- therefor In Column 3, Line 58, delete "To" and insert --$T_g$-- therefor In Column 3, Line 59, delete "To" and insert --$T_g$-- therefor In Column 3, Line 60, delete "Mc" and insert --$M_c$-- therefor

CERTIFICATE OF CORRECTION (continued)
U.S. Pat. No. 11,180,651 B2

In Column 4, Line 41, delete "Mc." and insert --$M_c$.-- therefor

In Column 6, Line 20, after "application", insert --.--

In Column 8, Line 6, delete "(Gig)" and insert --($G_{lc}$)-- therefor

In Column 8, Line 57, delete "(Mw/Mn)" and insert --($M_w/M_n$)-- therefor

In Column 9, Line 5, delete "dimethytformamide" and insert --dimethylformamide-- therefor In Column 9, Line 48, delete "(Mc)," and insert --($M_c$),-- therefor In Column 9, Line 49, delete "Mc" and insert --$M_c$-- therefor In Column 10, Line 4, delete "Mc" and insert --$M_c$-- therefor In Column 10, Line 6, delete "r in" and insert --$\Phi_f$ in-- therefor In Column 10, Line 7, delete "Φf" and insert --$\Phi_f$-- therefor In Column 10, Line 8, delete "Mc" and insert --$M_c$-- therefor In Column 11, Line 16, delete "(Tg)" and insert --($T_g$)-- therefor In Column 11, Line 26, delete "Tg" and insert --$T_g$-- therefor In Column 11, Line 30, delete "Tg" and insert --$T_g$-- therefor In Column 11, Line 34, delete "(T>Tg)" and insert --(T>$T_g$)-- therefor In Column 11, Line 45, delete "6" and insert --δ-- therefor In Column 11, Line 48, delete "Mc" and insert --$M_c$-- therefor In Column 11, Line 49, delete "6" and insert --δ-- therefor In Column 11, Line 49, delete "Tg." and insert --$T_g$.-- therefor In Column 11, Line 62, delete "w is" and insert --$w_i$ is-- therefor In Column 11, Line 63, delete "p$_i$" and insert --$\rho_i$-- therefor In Column 12, Line 32, delete "Mc=700" and insert --$M_c$=700-- therefor In Column 12, Line 47, delete "Mc" and insert --$M_c$-- therefor

CERTIFICATE OF CORRECTION (continued)
U.S. Pat. No. 11,180,651 B2

In Column 12, Line 62, delete "Tg" and insert --$T_g$-- therefor

In Column 12, Line 65, delete "Tg" and insert --$T_g$-- therefor

In Column 12, Line 65, delete "Mc" and insert --$M_c$-- therefor

In Column 12, Line 66, delete "(1/Mc" and insert --(1/$M_c$-- therefor

In Column 12, Line 66, delete "1.4×10-3" and insert --1.4×$10^{-3}$-- therefor

In Column 13, Line 2, delete "Tg" and insert --$T_g$-- therefor

In Column 13, Line 3, delete "1/Mc," and insert --1/$M_c$,-- therefor

In Column 13, Line 12, delete "4" and insert --ζ-- therefor

In Column 13, Line 22, delete "Mc" and insert --$M_c$-- therefor

In Column 13, Line 23, delete "Mc" and insert --$M_c$-- therefor

In Column 13, Line 25, delete "Gr" and insert --$G_r$-- therefor

In Column 13, Line 25, delete "Mc" and insert --$M_c$-- therefor

In Column 13, Line 32, delete "p" and insert --ρ-- therefor

In Column 13, Line 38, delete "Gr" and insert --$G_r$-- therefor

In Column 13, Line 47, delete "Mc" and insert --$M_c$-- therefor

In Column 13, Line 49, delete "Mc" and insert --$M_c$-- therefor

In Column 13, Line 52, delete "Mc" and insert --$M_c$-- therefor

In Column 13, Line 62, delete "Mc" and insert --$M_c$-- therefor

In Column 14, Line 6, delete "Mc" and insert --$M_c$-- therefor

In Column 15, Line 30, delete "Mc" and insert --$M_c$-- therefor

In Column 15, Line 38, delete "Mc" and insert --$M_c$-- therefor

In Column 15, Line 41, delete "Mc" and insert --$M_c$-- therefor

In Column 15, Line 47, delete "Mc." and insert --$M_c$.-- therefor

In Column 15, Line 61, delete "Mc," and insert --$M_c$,-- therefor

In Column 15, Line 64, delete "Mc" and insert --$M_c$-- therefor

In Column 16, Line 7, delete "Mc" and insert --$M_c$-- therefor

In Column 17, Line 14, delete "dearly" and insert --clearly-- therefor

In Column 17, Line 27, delete "Mc." and insert --$M_c$.-- therefor

In Column 17, Line 37, delete "Mc." and insert --$M_c$.-- therefor

In Column 17, Line 53, delete "Mc" and insert --$M_c$-- therefor

In Column 17, Line 57, delete "Mc" and insert --$M_c$-- therefor

In Column 18, Line 54, delete "=20 nm" and insert --≈20 nm-- therefor

In Column 18, Line 57, delete "AK," and insert --$\Delta K_{Ic}$-- therefor

In Column 19, in table 1, Line 33, delete "$\Delta K_{Ic}$" and insert --$\Delta K_{Ic}$-- therefor In Column 19, in table 1, Line 33, delete "$\Delta G_{Ic}$)" and insert --$\Delta G_{Ic}$)-- therefor In Column 21, Line 22, delete "Tg" and insert --$T_g$-- therefor In the Claims In Column 22, Line 25, in Claim 1, delete "(Gl$_c$)" and insert --($G_{Ic}$)-- therefor In Column 22, Line 26, in Claim 1, delete "Gl$_c$" and insert --$G_{Ic}$-- therefor In Column 22, Line 27, in Claim 1, delete "Gl$_c$" and insert --$G_{Ic}$-- therefor In Column 22, Line 30, in Claim 1, delete "Gl$_c$" and insert --$G_{Ic}$-- therefor In Column 23, Line 6, in Claim 12, delete "copolymer," and insert --copolymer;-- therefor In Column 23, Line 14, in Claim 13, delete "micelle:" and insert --micelle;-- therefor